(12) United States Patent
Mount et al.

(10) Patent No.: US 6,987,332 B2
(45) Date of Patent: Jan. 17, 2006

(54) POWER CONDITIONER AND BACKUP FOR SECURITY SCANNING EQUIPMENT

(75) Inventors: Robert L. Mount, Lindon, UT (US); Douglas S. Robinson, Peovo, UT (US)

(73) Assignee: Power Innovations International, Inc., Lindon, UT (US)

( * ) Notice: Subject to any disclaimer, the term of this patent is extended or adjusted under 35 U.S.C. 154(b) by 0 days.

(21) Appl. No.: 10/762,608

(22) Filed: Jan. 22, 2004

(65) Prior Publication Data
US 2004/0150371 A1  Aug. 5, 2004

Related U.S. Application Data

(60) Provisional application No. 60/441,609, filed on Jan. 22, 2003.

(51) Int. Cl.
*H02J 7/02* (2006.01)

(52) U.S. Cl. ............................................. 307/66; 307/80

(58) Field of Classification Search ................. 307/64, 307/80, 66; 378/101; 320/107; 429/97
See application file for complete search history.

(56) References Cited

U.S. PATENT DOCUMENTS

| | | | | |
|---|---|---|---|---|
| 2,145,581 A | * | 1/1939 | Bright | .......................... 429/97 |
| 2,375,866 A | * | 5/1945 | Nelms et al. | ................ 320/107 |
| 3,821,997 A | * | 7/1974 | Sieren | ........................ 180/68.5 |
| 4,160,571 A | * | 7/1979 | Bigotti | ........................ 312/327 |
| 5,764,504 A | * | 6/1998 | Brand et al. | ................. 363/144 |
| 5,808,376 A | * | 9/1998 | Gordon et al. | ................. 307/66 |
| 5,835,364 A | * | 11/1998 | DeWinter et al. | ............. 363/45 |
| 2003/0007369 A1 | * | 1/2003 | Gilbreth et al. | ............... 363/35 |
| 2003/0202344 A1 | * | 10/2003 | Kenny et al. | ................ 362/183 |

OTHER PUBLICATIONS

"How Well Do Dogs and Other Animals Hear?" Frequency Hearing Ranges in Dogs and Other Species. Apr. 13, 2001, http://web.archive.org/web/20010413172522/http://www.lsu.edu/deafness/HearingRange.html.*

* cited by examiner

*Primary Examiner*—Brian Sircus
*Assistant Examiner*—Brett Squires
(74) *Attorney, Agent, or Firm*—Everett D. Robinson; Parsons Behle & Latimer

(57) ABSTRACT

Disclosed herein are power conditioning systems for providing filtered, clean and reliable power to sensitive electrical or electronic loads and further to provide battery backed power to those loads. Further disclosed herein are such power conditioning systems for supplying clean power to security scanning equipment and to infant life support devices. One of the systems disclosed herein supports a 30 kVA combined load and includes a cabinet, a passive input circuit receiving three phase AC power, an AC to DC converter including a 12 pulse rectifier, a regulating DC to DC converter, a high frequency DC to AC inverter utilizing PWM at 50 kHz, an output passive filter, two banks of batteries permitting hot-swappable battery replacement and capable of supplying power for at least 10 minutes at full capacity load.

17 Claims, 43 Drawing Sheets

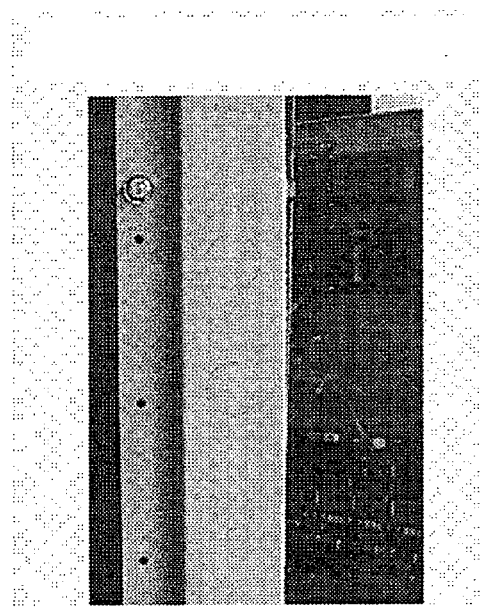 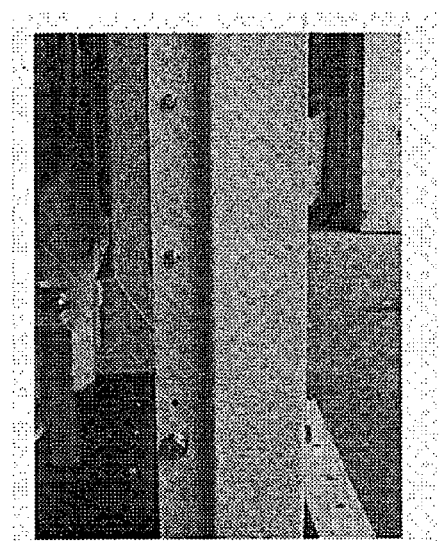
FIG. 37    FIG. 38
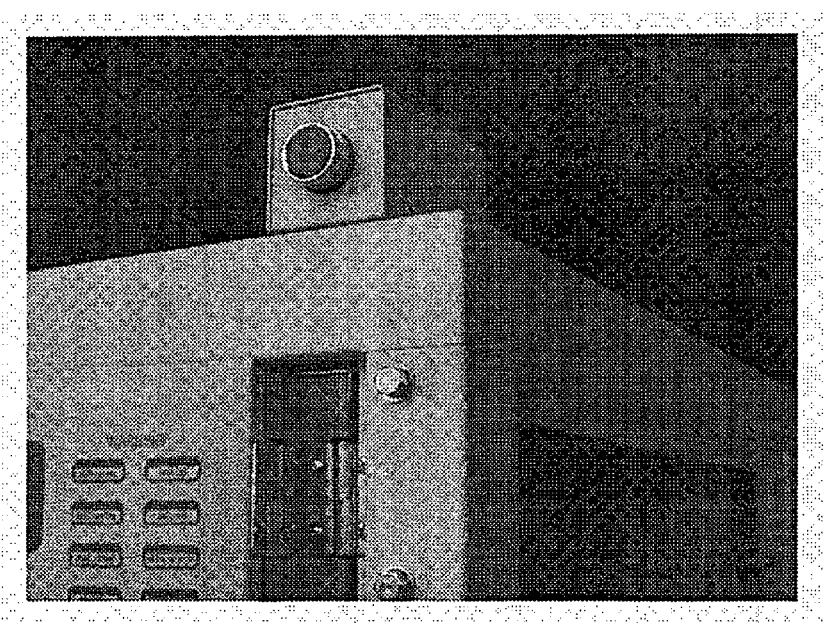
FIG. 39

FIG. 40A  FIG. 40B  FIG. 40C
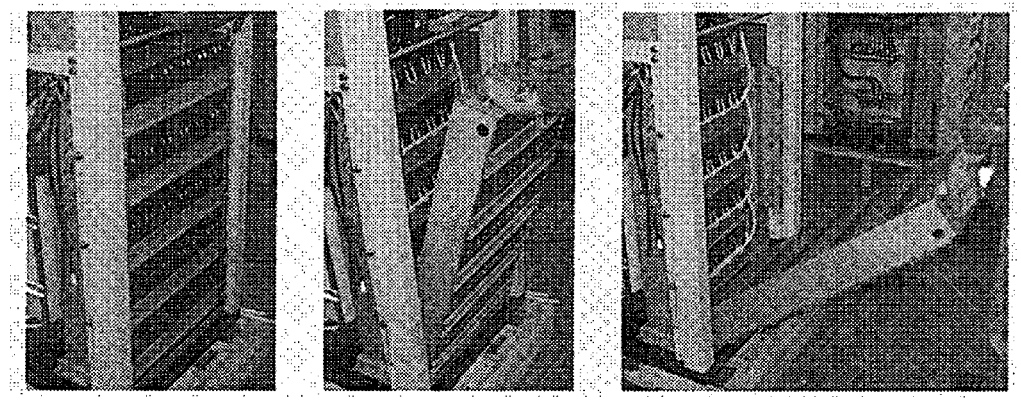
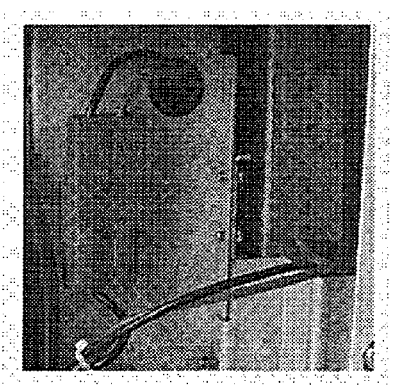
FIG. 41
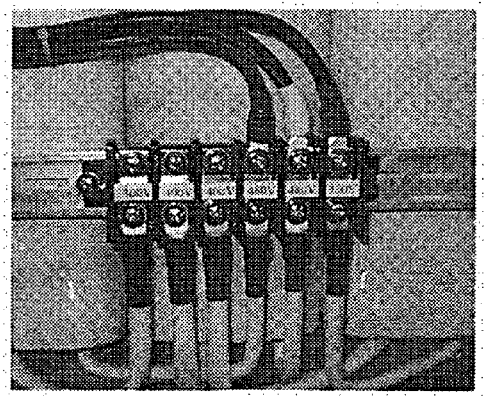
FIG. 42

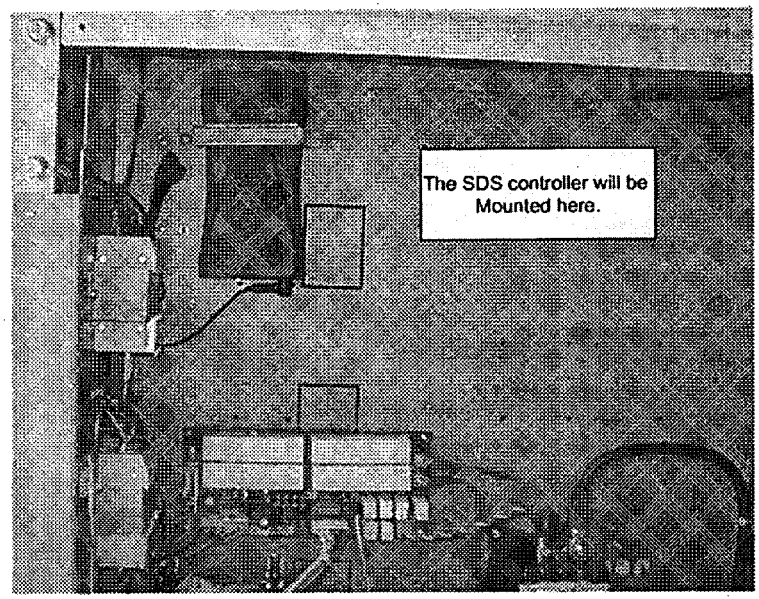
FIG. 44
FIG. 45
FIG. 46
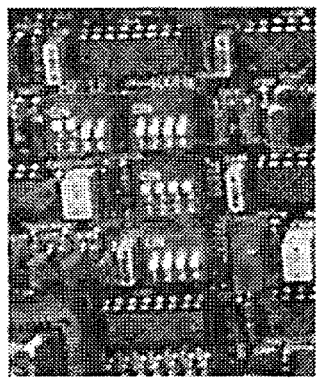
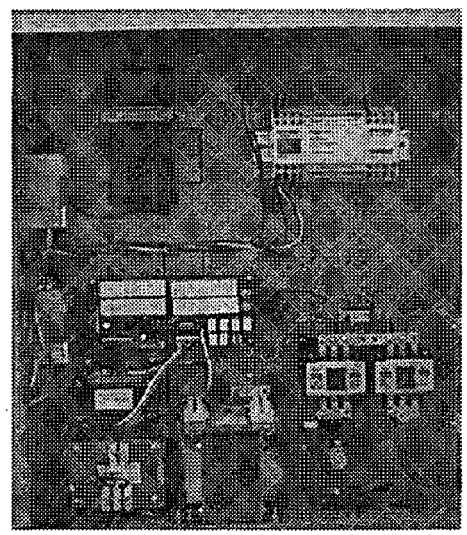

POWER CONDITIONER AND BACKUP FOR SECURITY SCANNING EQUIPMENT

CROSS-REFERENCE TO RELATED APPLICATIONS

This application claims the benefit of U.S. Provisional Application No. 60/441,609 filed Jan. 22, 2003, which is hereby incorporated in its entirety.

BACKGROUND

Ordinary utility power is subject to a number of problems. The first of these problems is outages, in which power is entirely interrupted to a customer for a period of minutes to days. Another problem is termed "brownouts", in which power is supplied to a customer at a lower voltage than specifications would normally permit.

A customer may provide an auxilliary short-term power source to mitigate these problems. A common auxilliary power source is a generator, for example powered by a diesel fuel engine, which can be stared in the event of an outage or brownout. Another auxilliary power source that has become common in recent years is the Uninterruptible Power Supply, or UPS. UPS systems, rather than having a generator, typically utilize a solid-state inverter powered from batteries, lead-acid being a common battery type. For certain applications, such as powering resistive loads and nonelectronic loads, these systems may be adequate to retain electrical equipment functionality without large inconvenience.

Other problems may exist with ordinary utility power. Spikes and dips may occur, for example, through the switching of circuits and the powering of motors near the point of power consumption, or the switching of mains circuits in the power distribution network. Noise may also be introduced on the power lines by "dirty" electronics, motor brushes and modified-sine wave inverters. Variations in voltage level and frequency may also occur, particularly where power is supplied from an auxiliary generator. Power may be interrupted to important electronic equipment for periods in duration from tens of milliseconds to even seconds, which may be mitigated at the equipment level by large reserviour capacitors and other techniques. Electronic equipment may be supplied with overvoltage as well, which may lead to premature equipment failure.

BRIEF SUMMARY

The claimed inventions relate generally to UPS systems and equipment for conditioning utility power and more particularly to a three phase power conditioner operable at 400 or 480 VAC including an AC to DC converter, two banks of batteries, an internal battery charger, a high frequency DC to AC power inverter and passive filters for filtering input and output power.

Disclosed herein are power conditioning systems for providing filtered, clean and reliable power to sensitive electrical or electronic loads and further to provide battery backed power to those loads. Further dislcosed herein are such power conditioning systems for supplying clean power to security scanning equipment and to infant life support devices. Detailed information on various example embodiments of the inventions are provided in the Detailed Description below, and the inventions are defined by the appended claims.

BRIEF DESCRIPTION OF THE DRAWINGS

FIG. 37 depicts the upper right front vertical rail of the first exemplary UPQ unit.

FIG. 38 depicts the lower right front vertical rail of the first exemplary UPQ unit.

FIG. 39 depicts the emergency cutout (ECO) switch of the first exemplary UPQ unit.

FIGS. 40a, 40b and 40c depict the access to the internal batteries of the first exemplary UPQ unit.

FIG. 41 depicts the inline battery bank connections of the first exemplary UPQ unit.

FIG. 42 depicts the 480 and 400 volt input transformer taps of the first exemplary UPQ unit.

FIG. 44 depicts the mounting of the internal Net Agent and DC power source and also the location of the Holjeron SDS controller of the first exemplary UPQ unit.

FIG. 45 depicts configuration switches of the first exemplary UPQ unit.

FIGS. 46, 47 and 48 depicts the Net Agent mounting, DC power source and Holjeron SDS controller of the first exemplary UPQ unit.

DETAILED DESCRIPTION

The public need for reliable security equipment has increased after the terrorist attacks in the United States of Sep. 11, 2001. Prior to that time, it was considered acceptable to continue using aging security equipment, such as common x-ray equipment utilizing human pattern recognition. With the recent priorities on increased security, it has become highly desirable to increase the amount of scanning of passenger luggage, detecting for example weapons or explosives, without burdening the public with excessive travel delays. As part of heightened airport security, bag scanning for all bags became law for all airports in the United States in January of 2003. New equipment was therefore sought for, not only in the United States but also for many airports and other terminals around the globe, with the capability of scanning much higher volumes of luggage. One manufacturer of such scanners is InVision Technologies Inc. of Newark, Calif., in the United States.

These new security devices are expensive capital equipment items. There is therefore a desire on the part of administrators to purchase as little equipment as possible to meet security needs under average conditions. It is therefore desirable to operate that equipment near capacity, and not purchase redundant systems. Under those conditions, it becomes critical to keep that equipment in operation, as a failure may lead to additional passenger delays or gaps in important security surveillance.

The most modern of security equipment includes computer equipment and other components that require a boot or "warm-up" period on start up, which may require a period of several to many minutes during which the equipment is not operational. Thus power interruptions may cause delays in the handling of passengers and luggage, which may be unacceptably long. Modern scanning equipment is also very sensitive, and power quality problems can lead to malfunctions and damage leading to costly downtime and delays. Auxilliary generators have not adequately solved these problems because (1) a generator cannot immediately supply power due to a start-up time, which causes a power interruption during that period and (2) auxilliary generators often produce poor-quality power.

As mentioned above, UPS systems have been available which can mitigate power losses for short periods. UPS systems, however, may be unsuitable for use with security equipment for a number of reasons. First, a common UPS system may not filter the incoming power to remove spikes, dips and noise. Second, many common UPS devices generate a low-frequency modulated modified sine wave, which introduces some high frequency noise on the supplied power. Additionally, many UPS devices will tolerate large variations in voltage and frequency of incoming power, passing poor quality power to loads, as these devices are designed as backup devices to be brought in use only on complete power failure.

Figure 14:
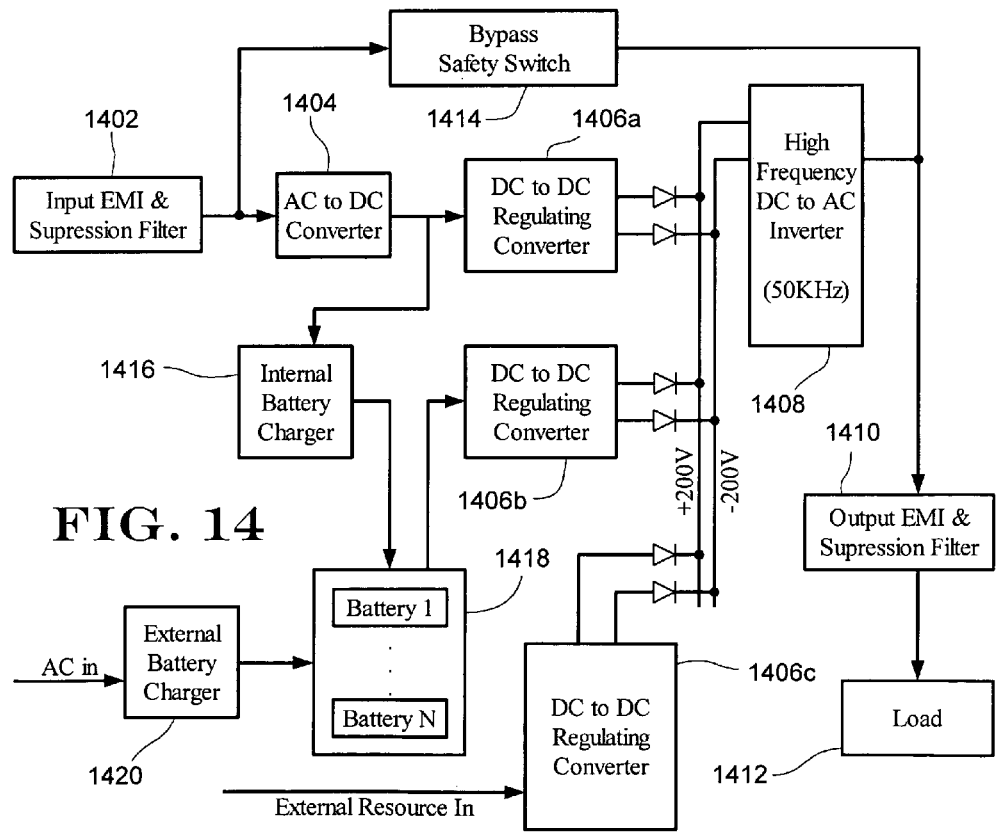
FIG. 14 depicts one internal configuration for a UPQ unit.

Herein are described Uniterruptible Power Quality (UPQ™) devices, which not only provide battery-backed power, but also provide clean power to supplied equipment even under conditions of dirty or failed power. Depicted in FIG. 14 is one UPQ internal configuration. In that configuration, incoming power is first passively filtered to remove noise and spikes. That filtered AC power is then converted to DC power, in this example at no more than 170 volts. That DC power is stepped up with a DC to DC regulating inverter, in this example producing a second-stage DC voltage at plus and minus 200 volts. That power is then received by a high frequency DC to AC inverter, in this example modulated at 50 kHz. The output of that inverter may produce single phase, three phase, or polyphase output. The output of the inverter is passed through another passive filter to remove the 50 kHz components, which is then supplied to loads as desired.

A UPQ system not only conditions power, as just described, but also provides a backup supply in the event of input power failure. In the example of FIG. 14, the 170 VDC is supplied to a battery charger, which charges 1 or more batteries. The battery power is supplied to a separate DC to DC regulating inverter, which supplies the second stage DC power in the event of power failure from the input power supply. Provision may also be made to charge batteries from an external supply, or supply the second stage DC power to the DC to AC inverter.

In addition, during an overload condition, a UPQ system may automatically transfer to "bypass" mode (if good power exists) to ensure that the critical load continues to receive power. The bypass function uses the AC supply power as its stand-by source. While in bypass mode, the connected equipment is still protected by filters, but the equipment is not isolated from the mains power and does not receive the benefit of voltage regulation or battery backup. The system automatically transfers back to the inverter when an overload condition has been cleared.

A UPQ system inverter may use a high frequency insulated gate bipolar transistor (IGBT) switched using pulse width modulation (PWM) in converting DC to AC power. This design may reduce the total number of electronic components, and make make for a lighter, smaller, more reliable and efficient system.

The exemplary UPQ systems disclosed herein include galvanic isolation on the output, which isolates the AC output from the input. This isolation may solve a problem of poor input grounding. Indeed, such a UPQ system may accept a different ground between the input and output, stopping current leakage through the ground. This galvanic isolation reduces the common mode noise that may be transferred to the output from the input source.

The exemplary UPQ systems also have an independent branch circuit for each output loop. In the event of a breaker trip or a short circuit on one of the output loops, the other output loops may continue to function, avoiding a total system shutdown.

The exemplary UPQ systems may also be started using internal or external batteries without an AC power source connected. Current limiting circuitry is included to protect from high inrush currents associated with DC battery connections on a dry DC bus. Those systems also include a CPU-controlled battery charger. That charger boots the charge to the batteries they are discharged to a minimum voltage, which may be about 2V/cell. This boost charge allows the batteries to charge at a faster rate while avoiding exposing the batteries to high charge currents. The charger may boost charge the batteries for several hours each month automatically if desired. During the boost charge cycle the temperature may be monitored, the charger keeping the ambient temperature below a threshold, for example 35 degrees centigrade.

The exemplary UPQ units may also automatically test the batteries. This test may occur after a boost charge, which might, for example, be performed if more than one month has elapsed from the last test. Following a test, the unit may notify a user of the battery condition and provide notification if batteries need to be replaced. By this procedure, an operator may ensure that the equipment will not be operated with failed batteries.

Figure 1:
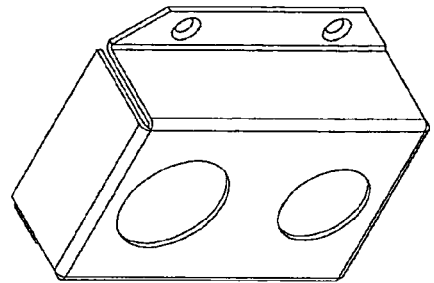
FIG. 1 depicts an outlet box of a first exemplary Uninterruptible Power Quality (UPQ) unit.
Figure 1:
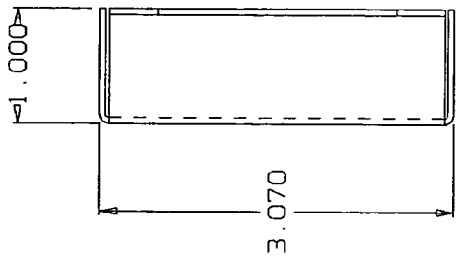
Figure 1:
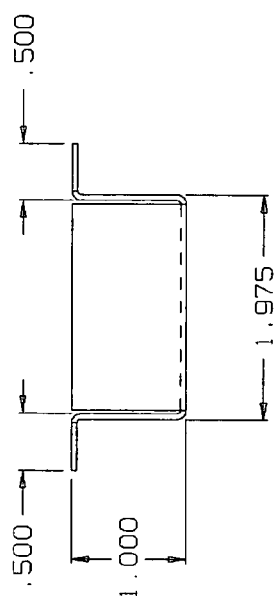
Figure 1:
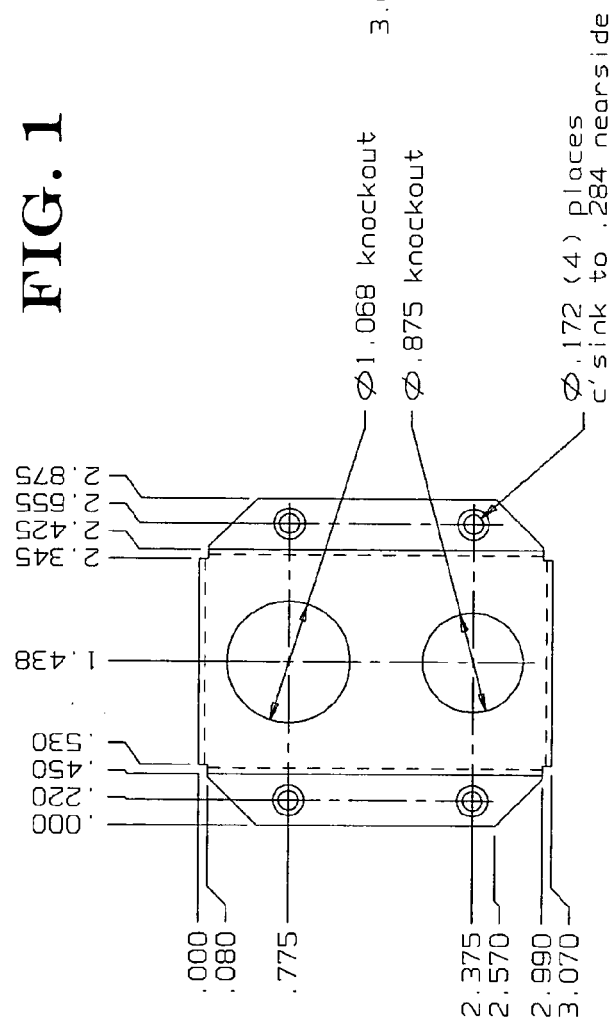
Figure 2:
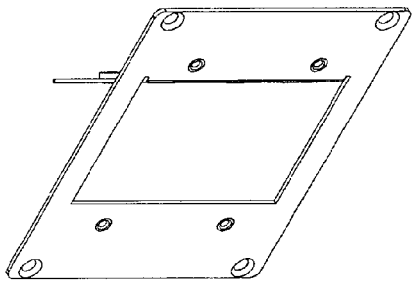
FIG. 2 depicts a charger outlet panel of the first exemplary UPQ unit.
Figure 2:
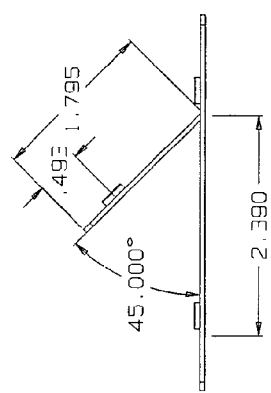
Figure 2:
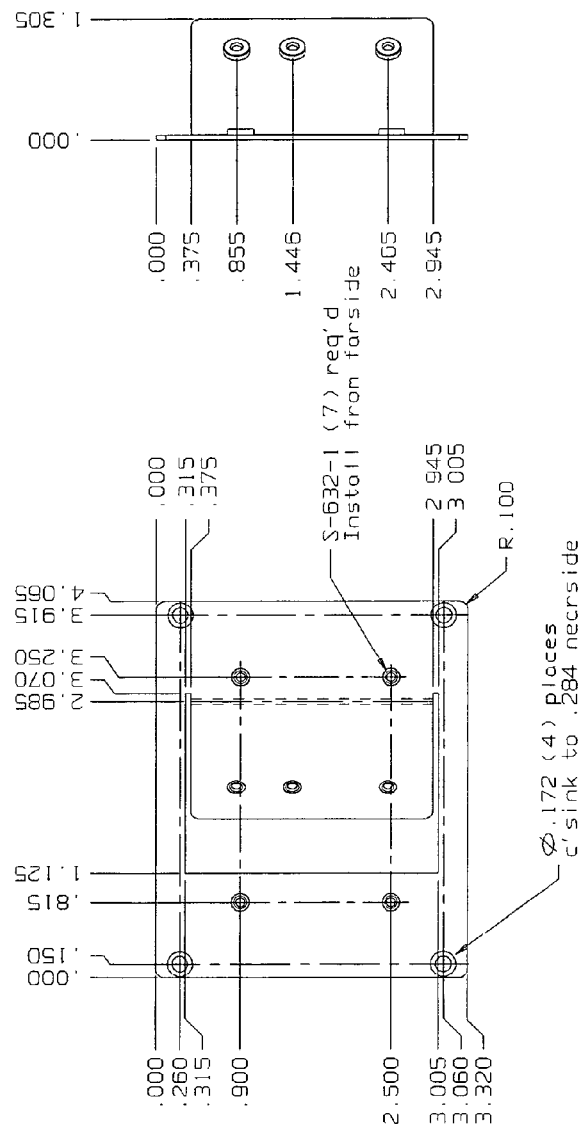
Figure 3:
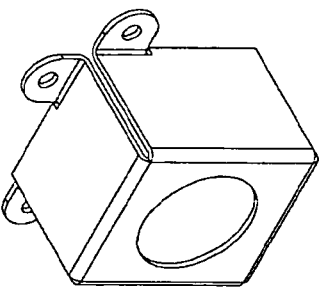
FIG. 3 depicts an inverter inlet box of the first exemplary UPQ unit.
Figure 3:
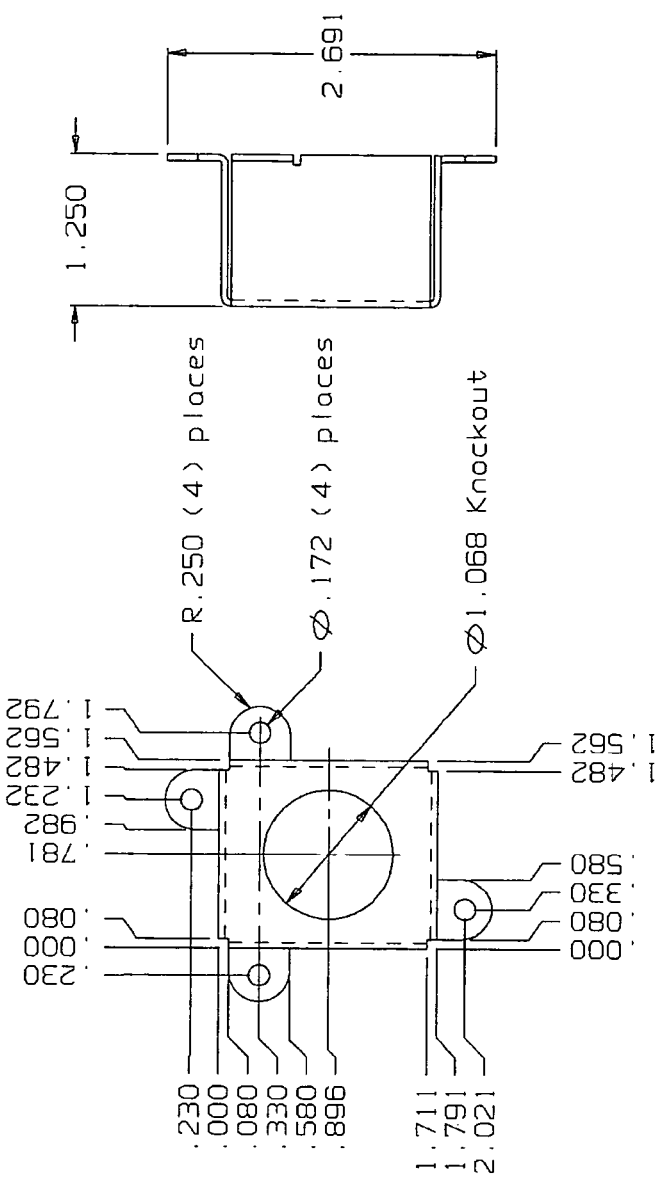
Figure 3:
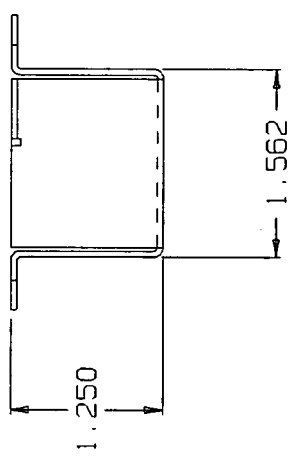
Figure 3:
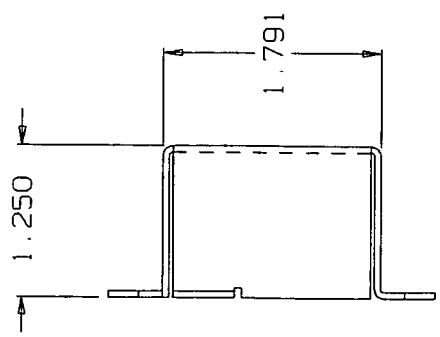
Figure 4:
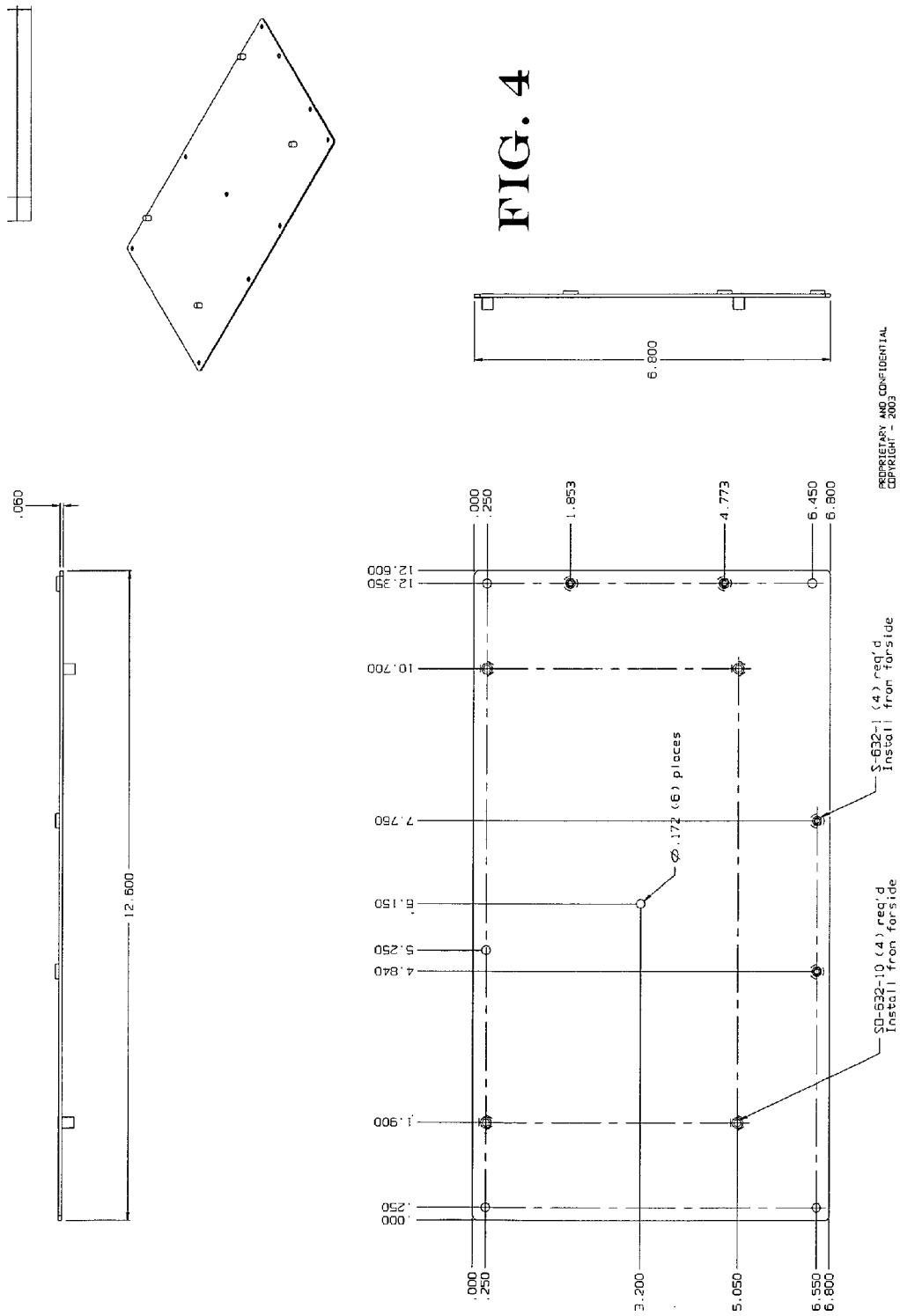
FIG. 4 depicts a charger adapter plate of the first exemplary UPQ unit.
Figure 5B:
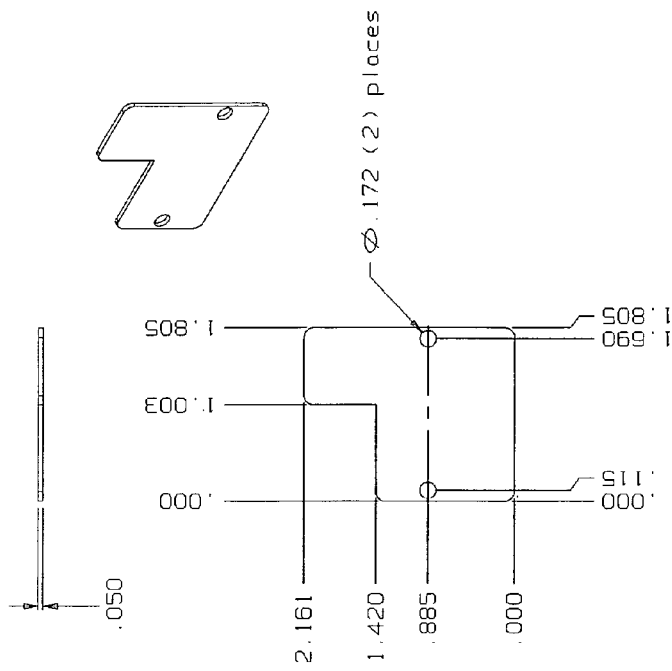
FIGS. 5a and 5b depict two charger cover plates of the first exemplary UPQ unit.
Figure 5A:
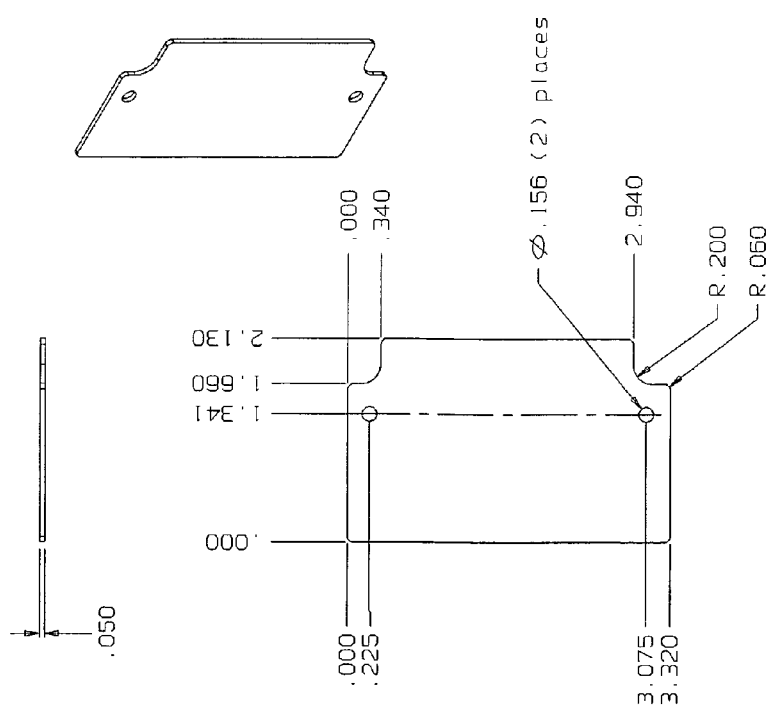
Figure 6:
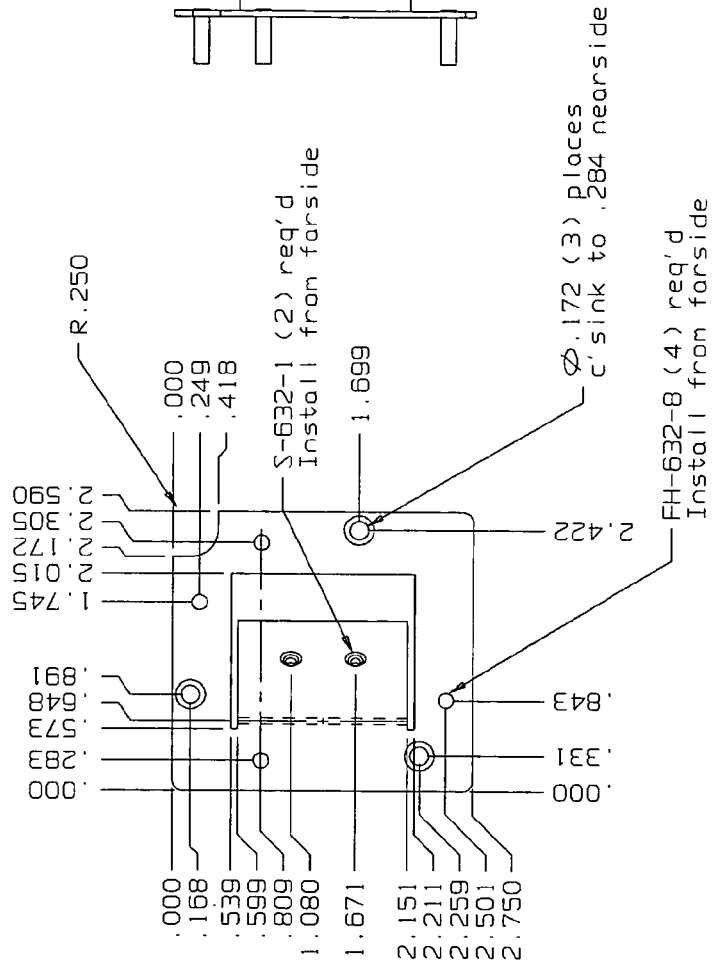
FIG. 6 depicts an inverter inlet panel of the first exemplary UPQ unit.
Figure 7:
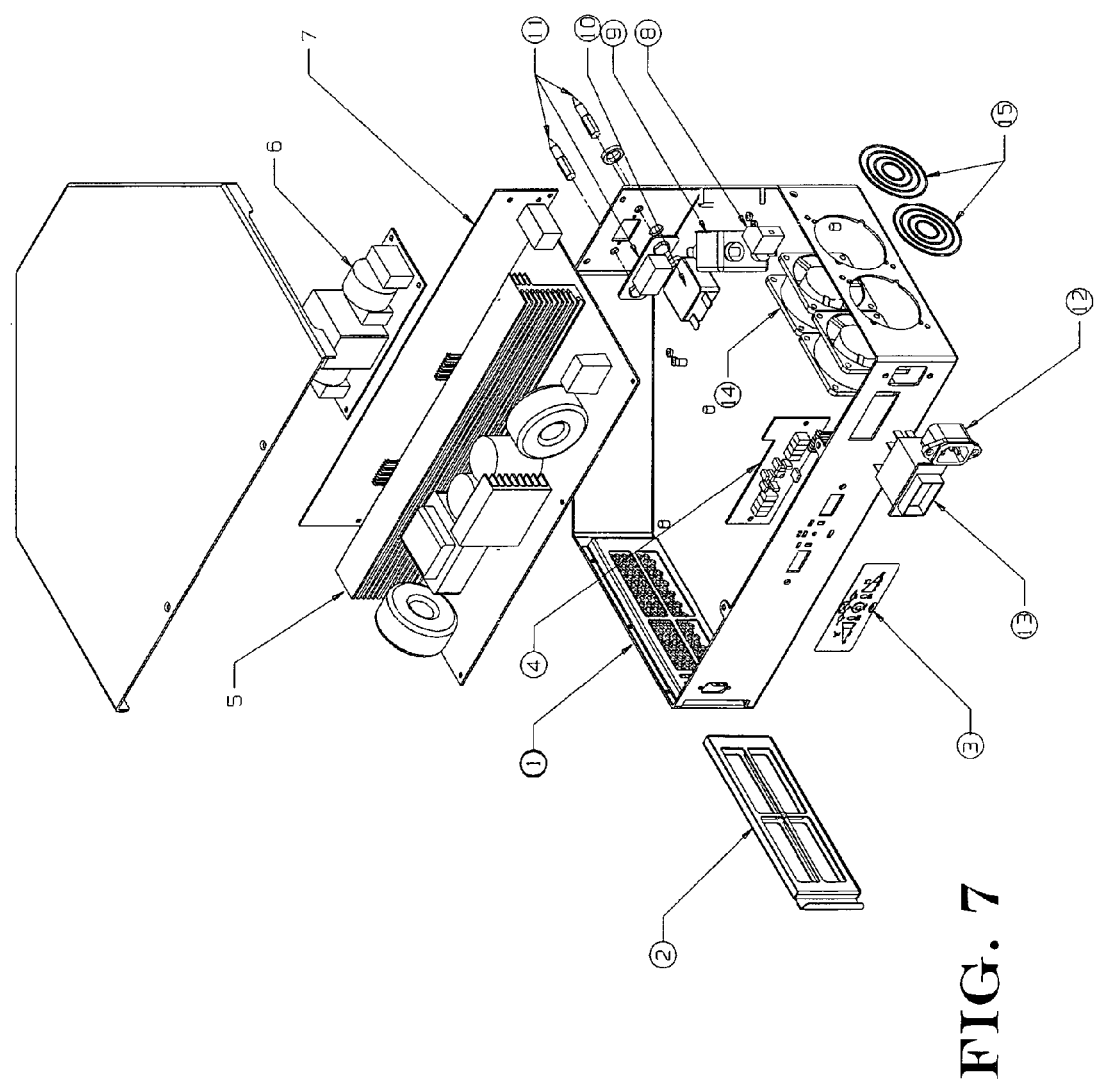
FIG. 7 depicts several parts in assembly position of a second exemplary UPQ unit.
Figure 8:
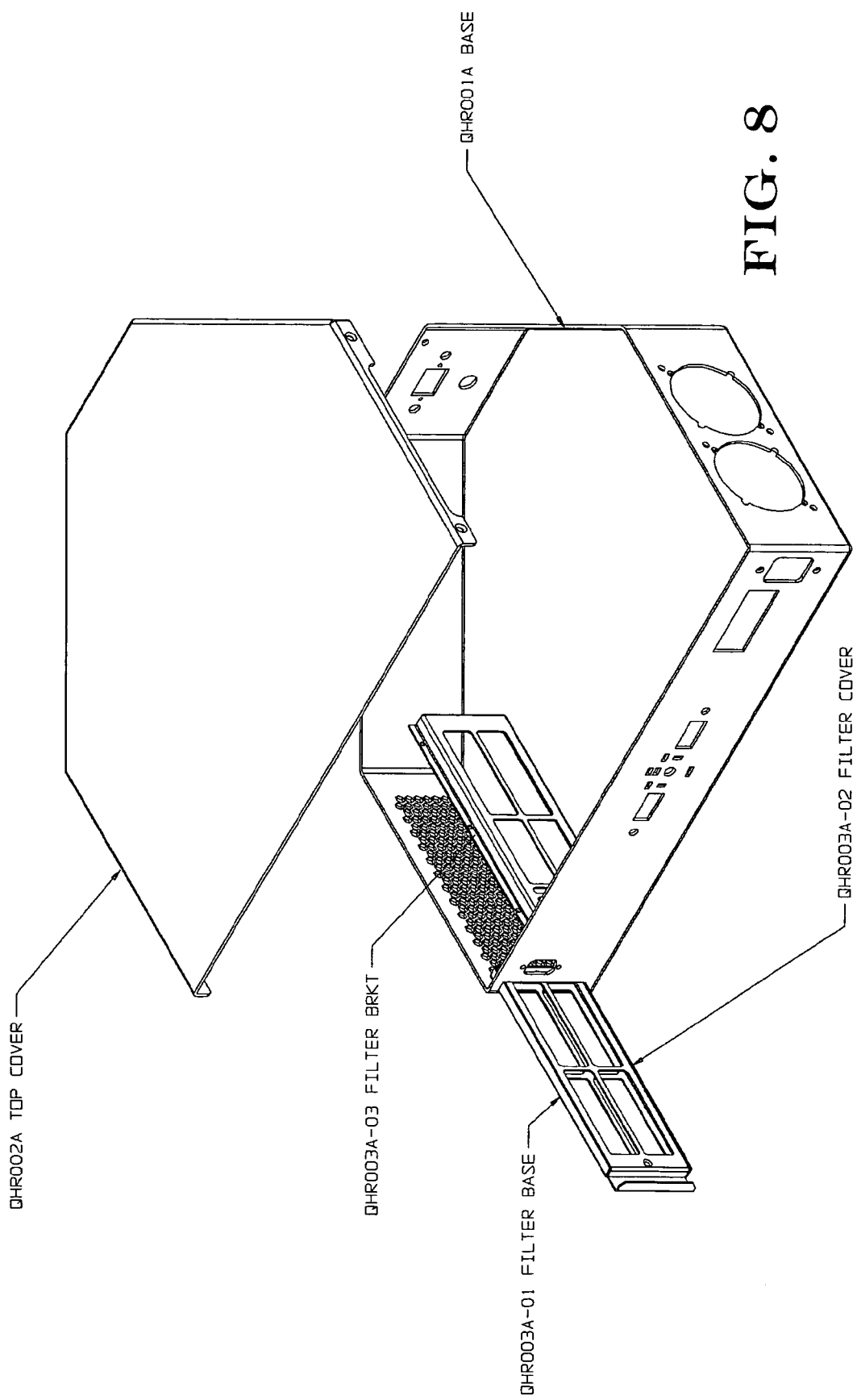
FIG. 8 depicts several sheet metal parts in assembly position of the second exemplary UPQ unit.
Figure 9:
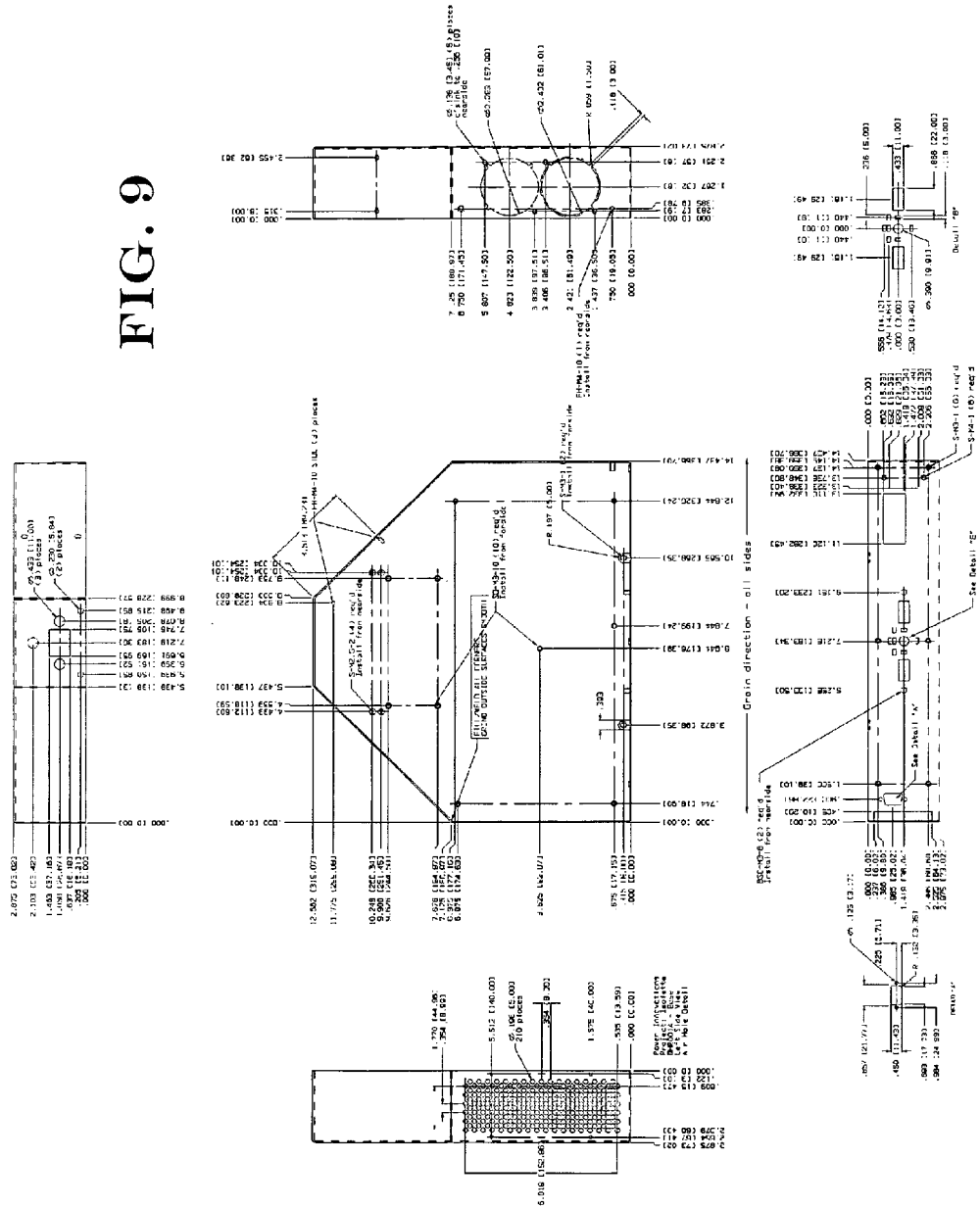
FIG. 9 depicts the base cabinet portion of the second exemplary UPQ unit.
Figure 10:
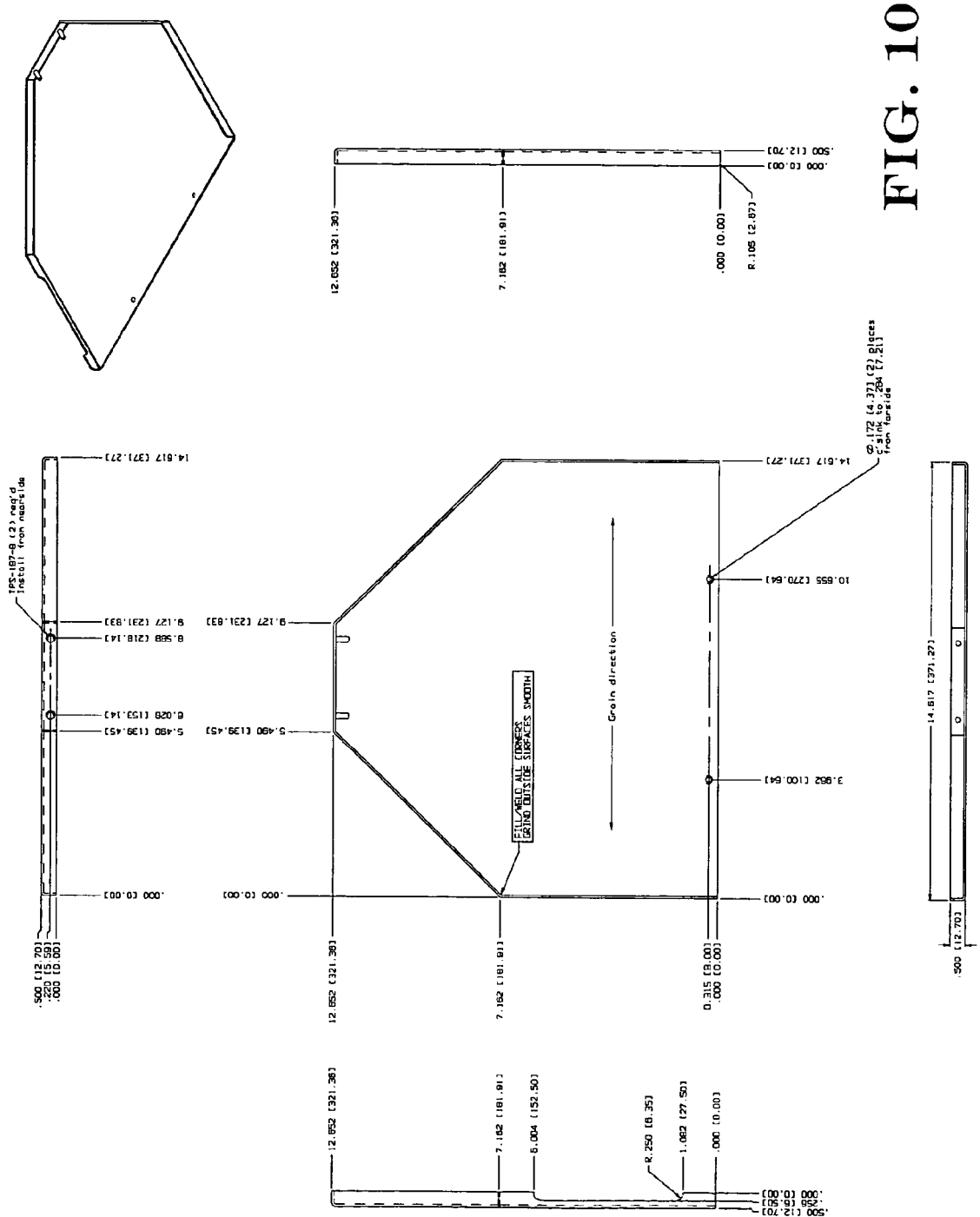
FIG. 10 depicts the top cover of the second exemplary UPQ unit.
Figure 11A:
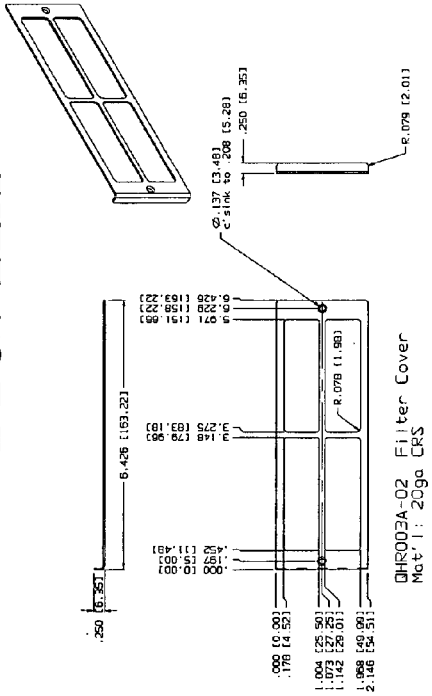
FIGS. 11a and 11b depict two filter cartridges of the second exemplary UPQ unit.
Figure 11B:
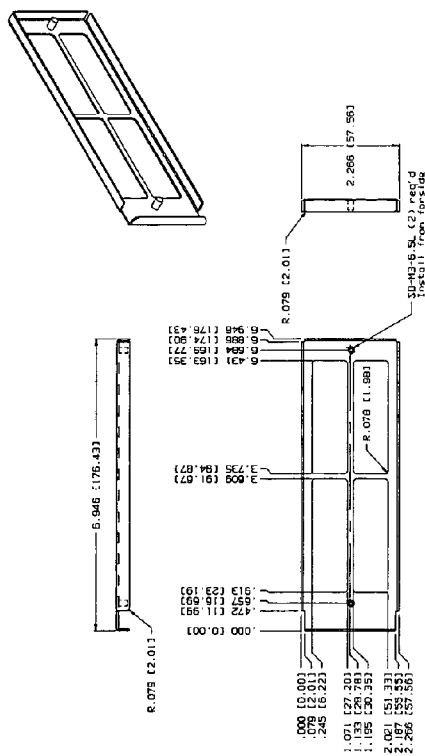
Figure 12:
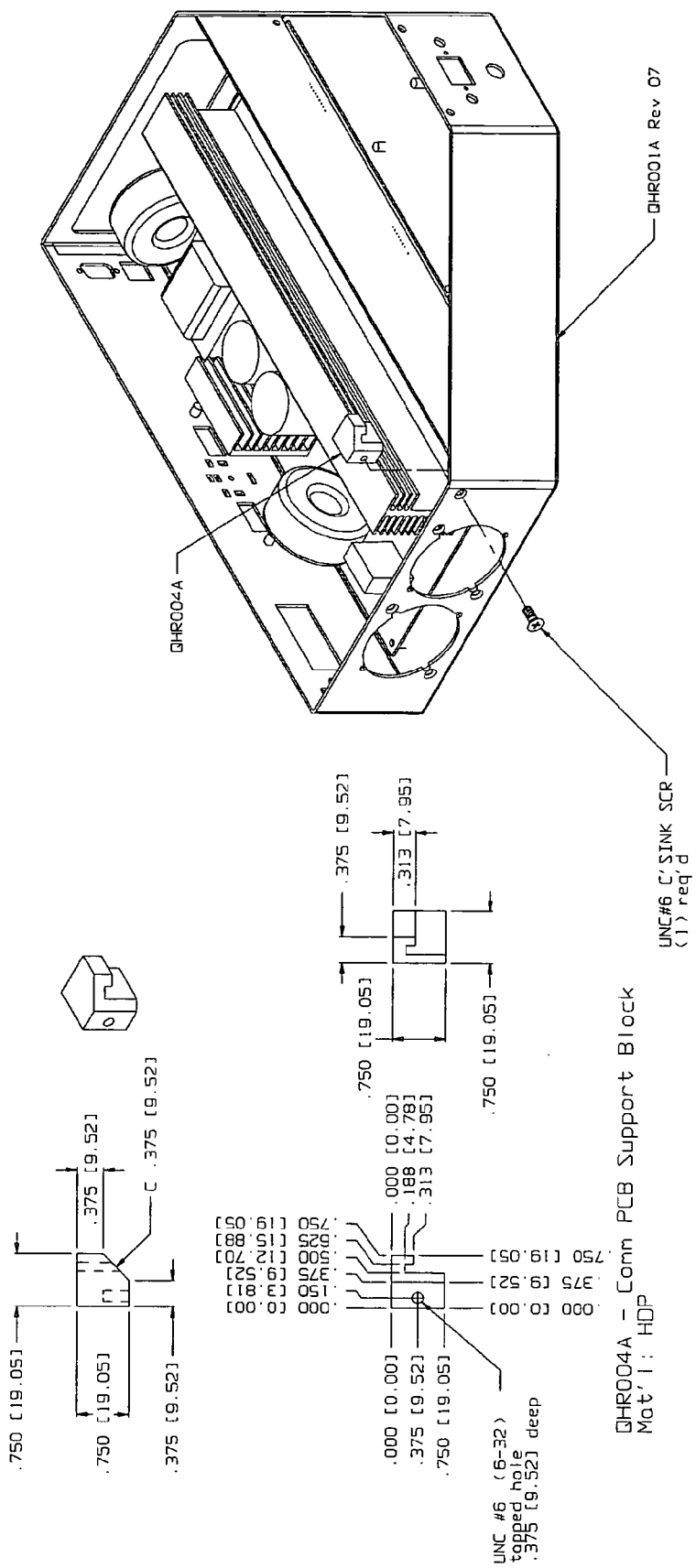
FIG. 12 depicts the PCB retainer block of the second exemplary UPQ unit.
Figure 13:
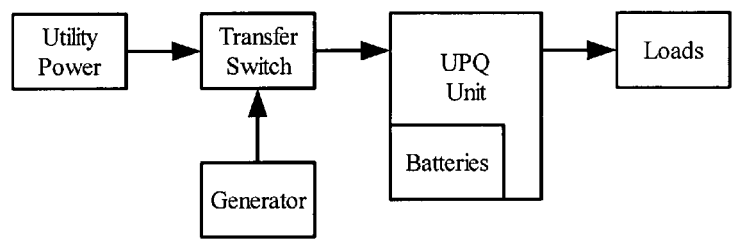
FIG. 13 depicts an installation environment of the first exemplary UPQ unit.

Referring now to FIG. 13, a configuration including a UPQ system is shown. That system is normally supplied with power from a utility source. A generator is also provided, whereby power may be supplied to the system by the selection of a transfer switch. A UPQ unit conditions incoming power for loads. The UPQ unit may also supply backup power using connected batteries.

A first exemplary Uninterruptible Power Quality (UPQ) unit will now be described having a 30 kVA capacity and being suitable for supplying continuous power to a CTX 9000 DSi™ explosive detection system available from InVision Technologies Inc. of Newark, Calif., United States. The CTX 9000 Dsi™ requires high quality power, not generally suppliable from an auxiliary generator. That UPQ unit includes power electronics and batteries in a very compact and self-contained package.

Figure 43A:
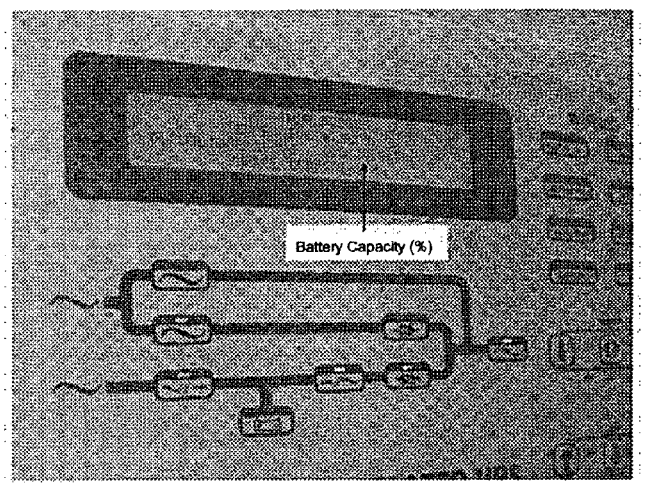
FIGS. 43a, 43b and 43c depict several display messages on the display of the first exemplary UPQ unit.
Figure 43B:
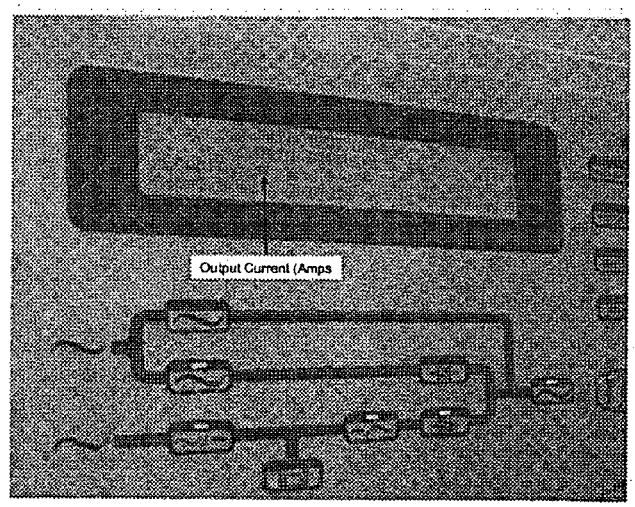
Figure 43C:
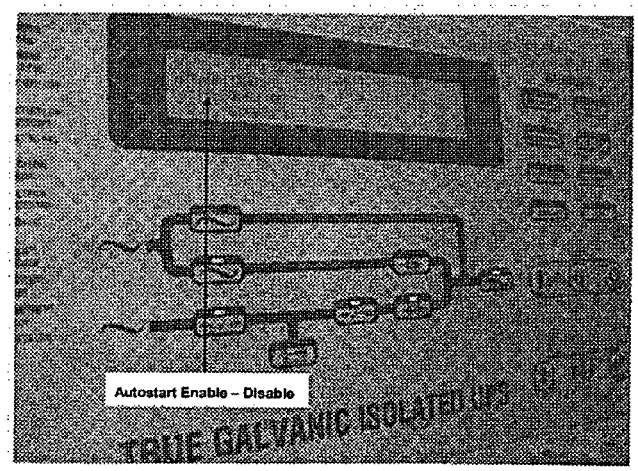
Figure 47:
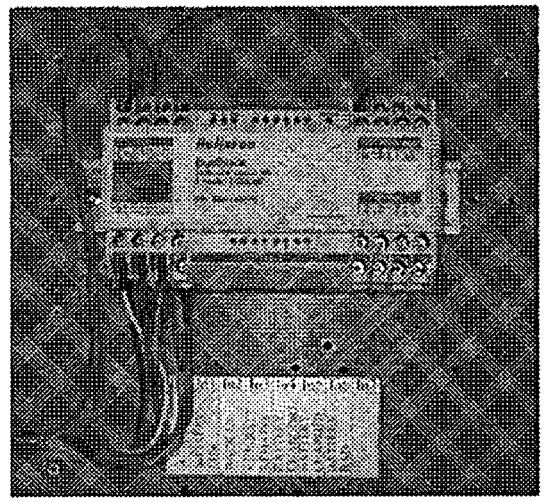
Figure 48:
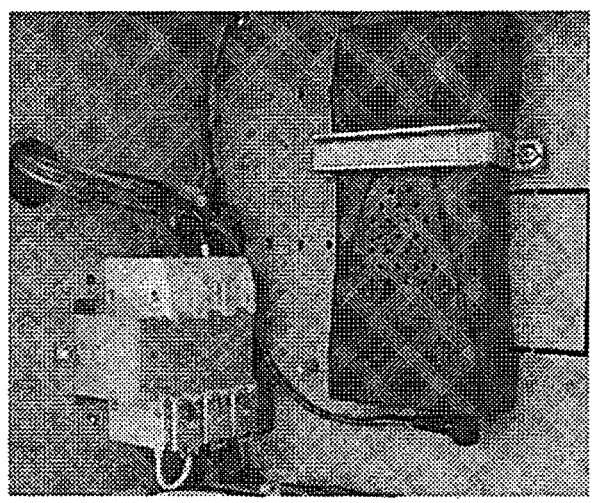
Figure 51:
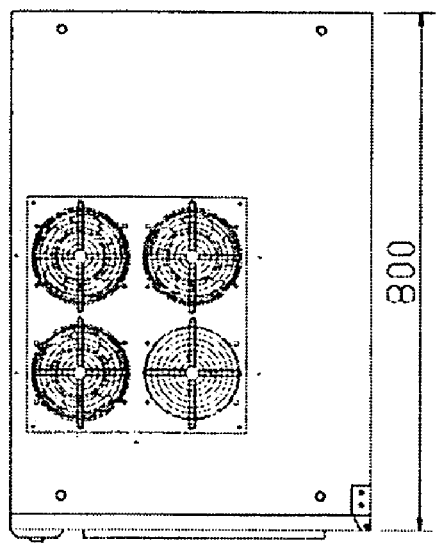
FIG. 51 depicts the exterior of the first exemplary UPQ unit.
Figure 51:
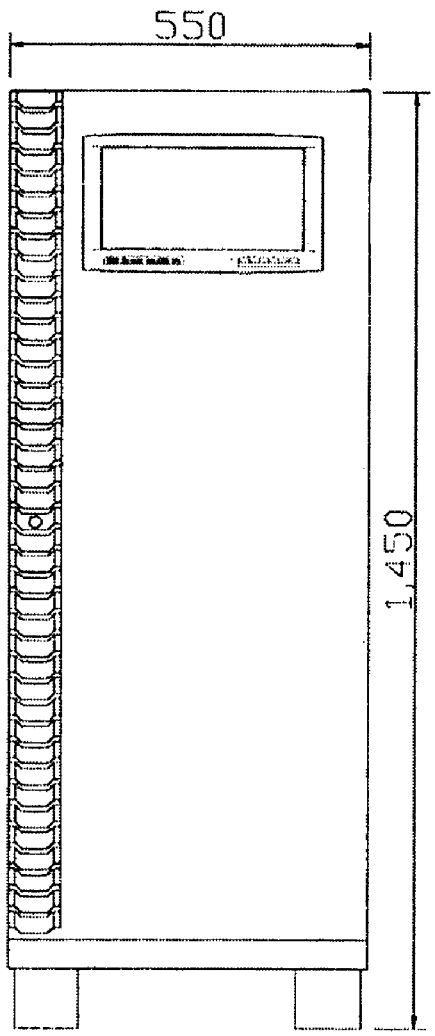
Figure 51:
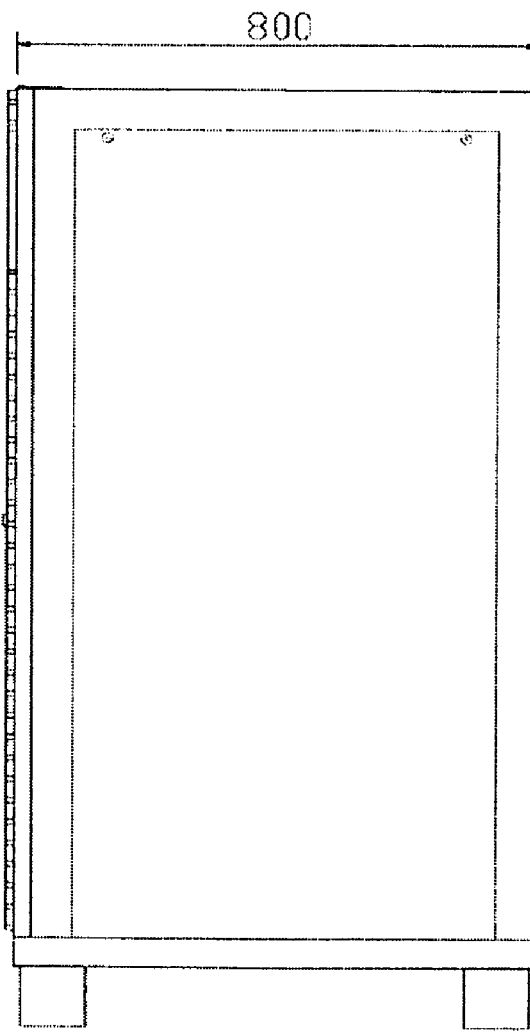

The first exemplary UPQ unit includes a cabinet as depicted in FIG. 51, with several system components being depicted in FIGS. 1, 2, 3, 4, 5a, 5b, and 6 briefly described above. The unit cabinet includes four vertical rails supporting the top and sides. The upper right and lower right front vertical rails are shown in FIGS. 37 and 38, respectively, wherein holes (or knockouts) are provided for cable feeds from the top, bottom or sides of the cabinet for input cables, output cables and interface cables. FIG. 39 depicts the emergency cutout (ECO) switch of the first exemplary UPQ unit. FIGS. 40a, 40b and 40c depict the access to the internal batteries of the first exemplary UPQ unit. Those figures show batteries secured in racks, the racks pivoting near the rack bottoms to provide access to a rack behind. This arrangement permits access to any particular battery without the removal of other batteries and without disconnecting both battery banks. FIG. 41 depicts the inline battery bank connections of the first exemplary UPQ unit. FIG. 42 depicts the 480 and 400 volt input transformer taps of the first exemplary UPQ unit. FIGS. 43a, 43b and 43c depict several display messages on the display of the first exemplary UPQ unit. FIG. 44 depicts the mounting of the internal Net Agent and DC power source and also the location of the Hoijeron SDS controller of the first exemplary UPQ unit. FIG. 45 depicts configuration switches of the first exemplary UPQ unit. FIGS. 46, 47 and 48 depicts the Net Agent mounting, DC power source and Holjeron SDS controller of the first exemplary UPQ unit.

The first exemplary UPQ unit (1) protects from random or erratic power fluctuations from utility power, (2) provides pure, consistent, quality power to the equipment, (3) gives the ability to choose power backup time based on the number of battery packs used with the equipment, and (4) allows changing or servicing of batteries while the system is in operation. That unit permits several battery configuations, through which security personnel may determine the length of desired backup time by including sufficient batteries to get through that period. Even while a system is connected to either utility or generator power, that exemplary UPQ unit isolates, filters, conditions, and regulates incoming power.

The first exemplary UPQ unit utilizes three phase power at the input, supporting 400 or 480 volt power over four wires at 50 or 60 Hz to support most power inputs worldwide. It includes a 12 pulse DC rectifier, thereby acheiving an input power factor of greater than 0.75 and preferably greater than 0.90. The unit is both Delta and Y configurable at the input and ouput. The unit includes independent dual internal battery banks, and multiple cable entry and exit points. Control of the unit may be provided by web based Ethernet connection, by which the unit may be monitored and shut down. In addition, the unit may be configured for SNMP. An RS232 serial port is included for control and monitoring of the unit. An array of warning and fault LEDs are provided, visible on the exterior of the unit, providing indications of several system functions, such as a low battery condition. An LCD display is included providing text warning and fault messages. The unit includes a Holjeron SDS controller for interface with the InVision equipment. An Emergency Power Off (EPO) switch is also provided for disabling the power output, and may be configured to be normally open or normally closed, and also supports remote/relay control. The unit is air-cooled, with exhaust fans located at the top and midsection of the unit to supplement air flow. To protect from dust or particulates an intake air filter is incorporated.

When operating, a master CPU constantly monitors each system module in the first exemplary UPQ unit. Provision is made to perform PCB diagnostics. The unit may be configured by the user to auto-start if desired. Plug and play control boards are provided, which permit the unit to function in a limited capacity in the event of module failure or removal. The unit also provides inline battery isolation on shutdown. Each of the battery modules is removable for service, utilizing 100 amp Anderson disconnects per each battery bank. The unit includes an internal main breaker shutdown override, by which power may be passed-through the unit to supplied loads. The inverter, SCR and rectifier are mounted on removable rails.

The first exemplary UPQ unit includes steel construction, powder coated, and is mounted on locking casters for mobility. A unit of that type may be secured against earthquakes through stability mounting brackets. A number of UPQ units of that type may be secured together, if desired. The unit is minimally configured to supply 10 minutes of power at full load from internal batteries, with longer times configurable through additional batteries. Included batteries are preferably a maintentance free lead-acid type. A safety circuit breaker or fuse is provided for overload protection.

The first exemplary UPQ unit includes a master circuit breaker, which disconnects power from the input to the internal UPQ circuits. In that unit, a sensor senses the voltage at that breaker to discriminate a true mains power failure from a circuit breaker trip or open. If that circuit breaker is open, the connection from the batteries to the inverter is opened preventing AC output for safety.

The first exemplary UPQ unit includes a remote interface using the SDS interface protocol. Status signals may thereby be provided indicating (1) when power is being supplied from batteries, (2) when less than 50% of battery life remains, (3) whether or not the batteries are being charged and (4) an electrical fault.

Specifications for the first exemplary UPQ unit follow:

General:

| | |
|---|---|
| Input current (max Amp) | 23 |
| Output power capacity (VA) | 10000 |
| Output power capacity (watts) | 8000 |
| Output current (peak Amp) 3 phase output | 43 |
| UPQ power conditioning topology | Five-stage/true on-line sine wave |
| Nominal output voltage range (3 phase) | 480 V |
| Output frequency range | 50/60 Hz |
| Output frequency tracking | 5% of the input frequency |
| Output power factor | >.9 |
| Output waveform | High resolution pure sine wave |
| Input power factor (12 pulse rectifier) | >.85 |
| Input impedance of entire system | 750 m ohm |
| Input to output impedance | <5% |
| Remote power management | Yes |
| Outlets | Terminal block |

Voltage Regulation & Frequency

| | |
|---|---|
| Input frequency | 45–65 Hz for inverter phase lock frequency range |
| Input range: | 307 to 520 VAC |
| full load without using battery | ±20% |
| half load without using battery | ±25% |
| Output voltage regulation | ±1% |

Isolation

| | |
|---|---|
| Input to output isolation | Dielectric strength 5 kv, 120 db common mode attenuation |
| Common-mode noise reduction | Yes |
| Normal-mode noise reduction | Yes |

Suppression

| | |
|---|---|
| IEEE 587/ANSI 62.41 surge let-through (North America) | Yes Yes |
| IEEE 587/ANSI 62.41 surge let-through (international) | Yes Yes |
| Joules (energy absorption) | 2200 |
| TVSS MOV Joule Rating | 765 Joules per phase |
| TVSS Low pass filter | 750 Hz |
| Peak surge current | 20000 A |
| Multi-stage protection | Yes |
| Reverse inverter impulse protection | 54 Joules without batteries |
| IEC | 62040-2 |
| FCC | Class A |
| EN 60610 (leakage current) | <1 mA |
| Conditioning | Yes |
| Output THD (linear Load) | <2% |
| Output frequency regulation | 50/60 Hz ± 0.1 Hz |
| Current THD (12 pulse rectifier) | Maximum of 9% |
| Input frequency range | 50/60 Hz ± 7 Hz |
| Input power factor correction | Yes |

High Frequency On-Line Inverter

| | |
|---|---|
| Inverter design | Full Bridge |
| Inverter driver frequency | 20 KHz |
| Inverter regulation | 50/60 Hz ± 0.1 Hz |
| Overload capacity | >110% |
| Crest factor | 3:1 |
| Transfer time | Zero |
| Overall system efficiency | 93% |
| Rectifier efficiency | 98% |
| Inverter efficiency | >93% |
| System efficiency in battery backup mode | 93% |
| Static switch efficiency | 99.5% |
| UPQ to bypass/bypass to UPQ | Zero cross transfer, less than 4 mSec. (2 mSec. Minimum) |

Rectifier

| | |
|---|---|
| 12 Pulse | 6.4 Khz pulse width, 80 ps for 1.7 ms around 11 pulses |

Static Switch

| | |
|---|---|
| Voltage range | 173 VAC–277 VAC (line to neutral) |
| Frequency range | 45–55 Hz/55–65 Hz |
| Transfer time - main to inverter | 0 ms |
| Transfer time - inverter to main | 0 ms |
| Transfer time - overload 100% | 30 seconds |
| Transfer time - overload 300% | 1 second |

Battery (standard configurations)

| | |
|---|---|
| Full load run time (58 pcs. internal battery pack) | <10 minutes |
| Half load run time (58 pcs. internal battery pack) | >15 minutes |
| Extended battery packs | Cabinet |
| Recharge time | 5 to 8 hrs |
| Battery charger | Constant voltage with current limit |
| Maximum recharge current (amps) | 15 |
| Boost charge | 410 VDC/415 VDC |
| Float charge | 396 VDC/410 VDC |
| Battery low voltage | 320 VDC/305 VDC |
| Battery low stop voltage | 295 VDC/285 VDC |
| Hot-swappable | Yes |

Temperature to altitude

| | |
|---|---|
| Operating Temperature | 0 to 50 C. |
| Humidity | 0%–90% Non Condensing |
| Altitude | Less than 2000 Meters above sea level |
| De-rating temperature (c) altitude | 4 deg/1000 m |

Physical

| | |
|---|---|
| Q-LS W × D × H in mm | 550 × 800 × 1600 |
| Q-LS W × D × H in inches | 21.7 × 31.5 × 63 |
| Q-LS weight in Kg. (with internal battery pack) | 659.39 |
| Q-LS weight in lbs. (with internal battery pack) | 1453.7 |
| Q-LS battery pack A W × D × H in mm | 550 × 800 × 1600 |
| Q-LS battery pack A W × D × H in inches | 21.7 × 31.5 × 63 |
| Q-LS battery pack A weight in Kg. | 360 |
| Q-LS battery pack A weight in lbs. | 793.66 |
| Q-LS battery pack B W × D × H in mm | 550 × 800 × 1600 |
| Q-LS battery pack B W × D × H in inches | 21.7 × 31.5 × 63 |
| Q-LS battery pack B weight in Kg. | 720 |
| Q-LS battery pack B weight in lbs. | 1587.3 |
| Q-LS battery pack C W × D × H in mm | 550 × 800 × 1600 |
| Q-LS battery pack C W × D × H in inches | 21.7 × 31.5 × 63 |
| Q-LS battery pack C weight in Kg. | 961.75 |
| Q-LS battery pack C weight in lbs. | 2120.3 |

The following tables list specifications for breaker input ratings, approximate input and output cable sizes, as well as fuse ratings and approximate cable sizes for batteries. Inadequate cable size or oversized breakers will cause risk of fire or damage. These tables should be used for reference; however, final decision as to the cable sizes should be made by a qualified electrician and in accordance with local electrical codes and regulations.

| KVA | Input | Maximum Current Imax(A) | No-Fault Breaker NFB(A) |
|---|---|---|---|
| 10 | 230/400 V 3Ø | 25 | 25 |
| 20 | 230/400 V 3Ø | 50 | 50 |
| 30 | 230/400 V 3Ø | 73 | 75 |
| 40 | 230/400 V 3Ø | 98 | 100 |
| 50 | 230/400 V 3Ø | 122 | 125 |
| 60 | 230/400 V 3Ø | 147 | 150 |
| 80 | 230/400 V 3Ø | 172 | 175 |
| 100 | 230/400 V 3Ø | 215 | 225 |
| 120 | 230/400 V 3Ø | 258 | 300 |
| 160 | 230/400 V 3Ø | 344 | 350 |

Cable Size for Output

| KVA | Input | In(A) | Phase A/B/C or R/S/T (mm2) | Phase A/B/C or R/S/T (AWG) | Neutral N (mm2) | Neutral N (AWG) |
|---|---|---|---|---|---|---|
| 10 | 230/400 V 3Ø | 18 | 4 | 12 | 7 | 9 |
| 20 | 230/400 V 3Ø | 36 | 8 | 9 | 14 | 6 |
| 30 | 230/400 V 3Ø | 54 | 14 | 6 | 22 | 4 |
| 40 | 230/400 V 3Ø | 72 | 22 | 4 | 30 | 3 |
| 50 | 230/400 V 3Ø | 90 | 30 | 3 | 38 | 2 |
| 60 | 230/400 V 3Ø | 108 | 38 | 2 | 50 | 1 |
| 80 | 230/400 V 3Ø | 144 | 50 | 1 | 80 | 3/0 |
| 100 | 230/400 V 3Ø | 180 | 80 | 3/0 | 100 | 4/0 |
| 120 | 230/400 V 3Ø | 216 | 100 | 4/0 | 125 | 250MCM |
| 160 | 230/400 V 3Ø | 288 | 60(2) | 1/0 | 80(2) | 3/0(2) |

Cable Size for Output

| KVA | Input | In(A) | Phase A/B/C or R/S/T (mm2) | Phase A/B/C or R/S/T (AWG) | Neutral N (mm2) | Neutral N (AWG) |
|---|---|---|---|---|---|---|
| 10 | 230/400 v 3Ø | 15 | 4 | 12 | 7 | 9 |
| 20 | 230/400 v 3Ø | 29 | 8 | 9 | 14 | 6 |
| 30 | 230/400 v 3Ø | 46 | 14 | 6 | 22 | 4 |
| 40 | 230/400 v 3Ø | 58 | 22 | 4 | 30 | 3 |
| 50 | 230/400 v 3Ø | 72 | 30 | 3 | 38 | 2 |
| 60 | 230/400 v 3Ø | 91 | 38 | 2 | 60 | 1 |
| 80 | 230/400 v 3Ø | 116 | 60 | 1 | 80 | 3/0 |
| 100 | 230/400 v 3Ø | 144 | 80 | 3/0 | 100 | 4/0 |
| 120 | 230/400 v 3Ø | 182 | 100 | 4/0 | 125 | 250MCM |
| 160 | 230/400 v 3Ø | 232 | 60(2) | 1/0(2) | 80(2) | 3/0(2) |
| 240 | 230/400 v 3Ø | 348 | 100(2) | 4/0(2) | 125(2) | 250MCM (2) |
| 320 | 230/400 v 3Ø | 463 | 125(2) | 250MCM (2) | 150(2) | 300MCM (2) |
| 20 | 230 v 1Ø | 91 | 38 | 2 | 60 | 1 |
| 30 | 230 v 1Ø | 130 | 60 | 1 | 80 | 3/0 |
| 40 | 230 v 1Ø | 182 | 100 | 3/0 | 125 | 250MCM |
| 50 | 230 v 1Ø | 217 | 150 | 300MCM | 60(2) | 1/0(2) |

A second exemplary UPQ is intented for use in with infant incubators and warmers. Incubators and monitors are used in hospitals to address the life support needs of premature babies. Such equipment saves infant lives. It is reported that in some areas of the world infant mortality exceeds 20 percent due to the lack of such equipment. Some incubators and other monitoring systems are placed in hospital delivery rooms, which may be used immediately after birth. Infants are then relocated to nursuries or other places in hospitals, requiring either the removal of infants from the equipment or the disconnection of the equipment from mains power during relocation. During this period the infant may not receive the benefit of the equipment, perhaps for several minutes at a time. For some newborn infants, particularly premature infants, this period may have an unhealthy effect.

That equipment may also be adversely affected by interruptions in power. A power interruption may reset the equipment, requiring an attendant to verify the state of the equipment and potentially reprogram it if required. A hospital may have a number of incubators in use, which introduces a burden on the hospital staff and also the potential for mistakes to be made.

Additionally, some medical environments do not have a backup source of power, for example in rural or in third-world countries. In those environments the failure of power may expose an infant to a life-threatening event.

A second exemplary UPQ is intended to be incorporated into the base of infant life support equipment, such as an incubator, that UPQ being shown generally in FIGS. 7, 8, 9, 10, 11*a,* 11*b* and 12. The housing of that UPQ is narrow at the front, which defines an alignment feature for insertion into the equipment base. That UPQ provides portability for the power supply and enables the moving of vital life support equipment with the baby throughout a hospital environment. The system (1) protects from random or erratic power fluctuations from utility power, (2) provides pure, consistent, quality power to life support equipment, and (3) provides 25 to 50 minutes of (normal use) power backup time (10 to 20 minutes full load) when the life support system must be moved or in the event of power failure. That UPQ conditions the power supply of the incubator (or other equipment), which may prolong the life thereof. Dual batteries may be included; if so, one battery may be removed or replaced while the other battery supplies power for the UPQ unit with no interruption of output power. An option may be provided to communicate via a network, an IP address or dial-up connection a monitoring computer built into the UPQ unit, providing remote monitoring and optionally control functions. The internal electronics of that UPQ unit may be similar or identical to a UPQ system manufactured by Power Innovations International, Inc. of Lindon, Utah in the United States.

Figure 15:
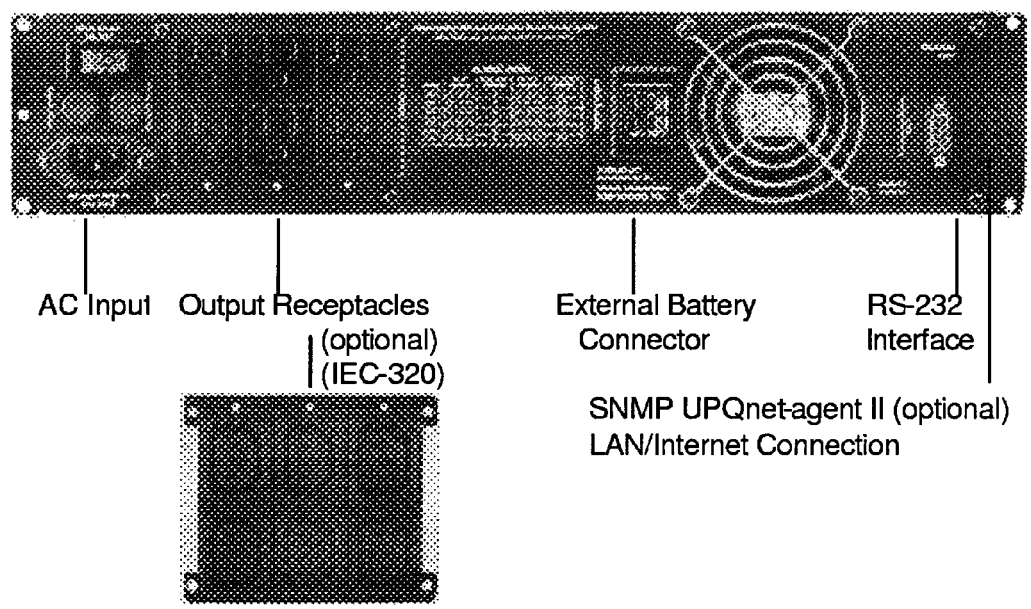
FIG. 15 depicts the rear of a third exemplary UPQ unit.
Figure 16:
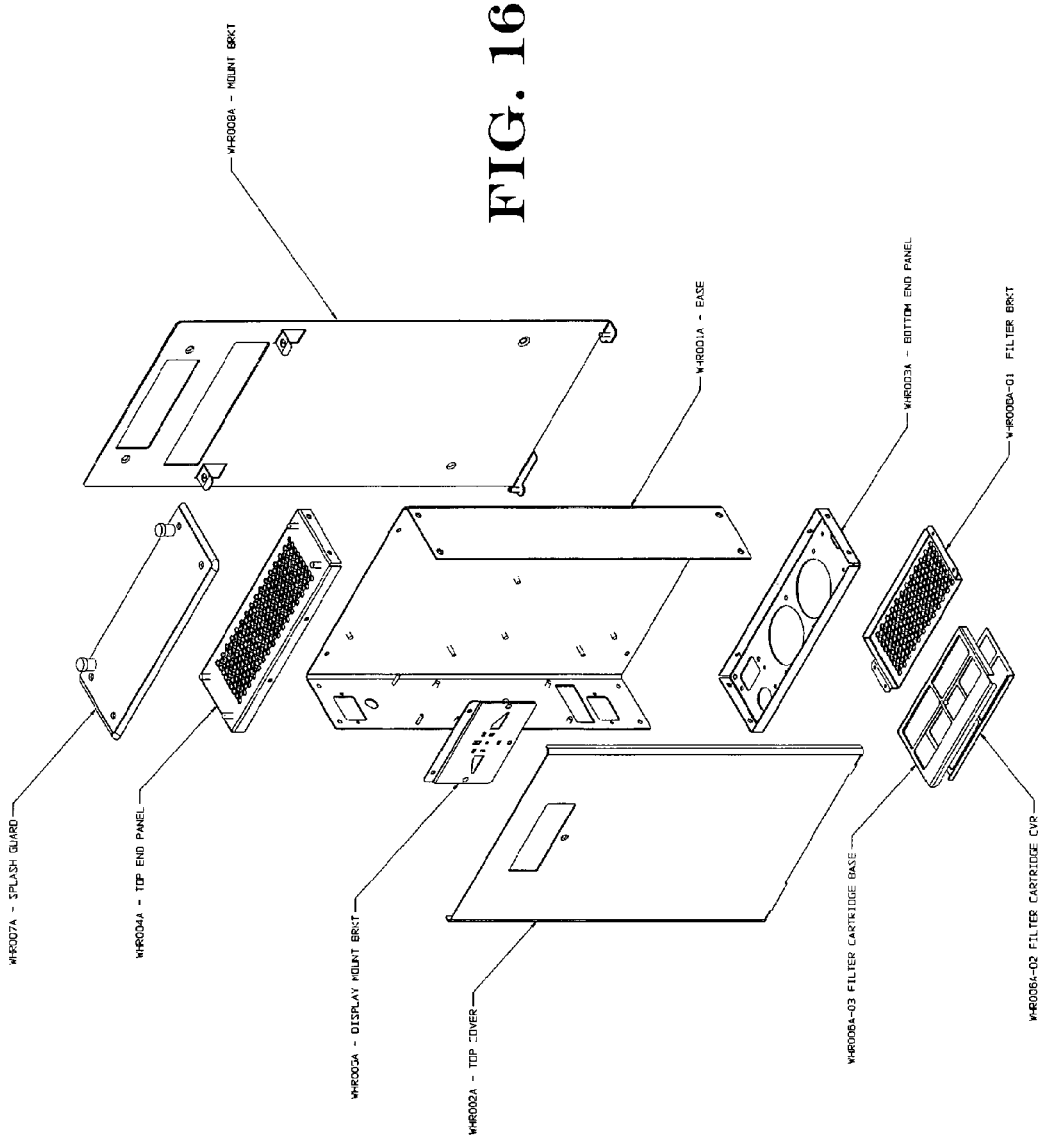
FIG. 16 depicts several sheet metal components of the inverter portion of a fourth exemplary UPQ unit.
Figure 17:
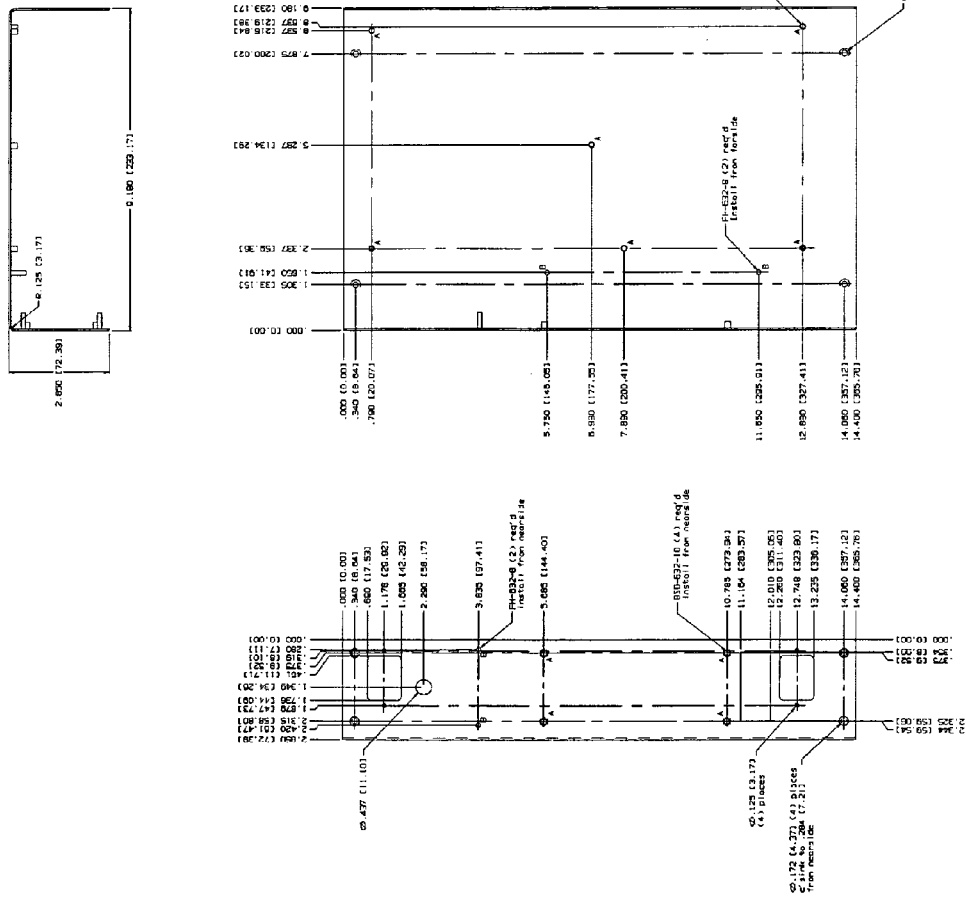
FIG. 17 depicts the base component of the inverter portion of the fourth exemplary UPQ unit.
Figure 18:
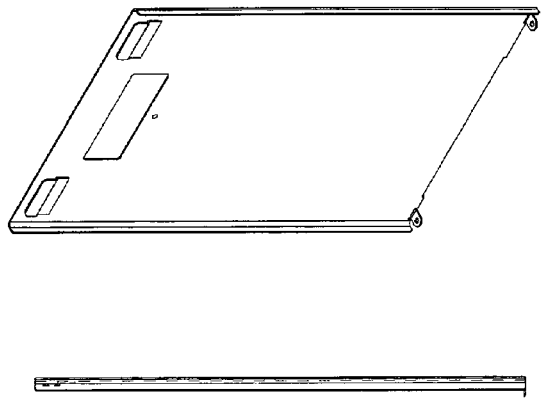
FIG. 18 depicts the top cover of the inverter portion of the fourth exemplary UPQ unit.
Figure 18:
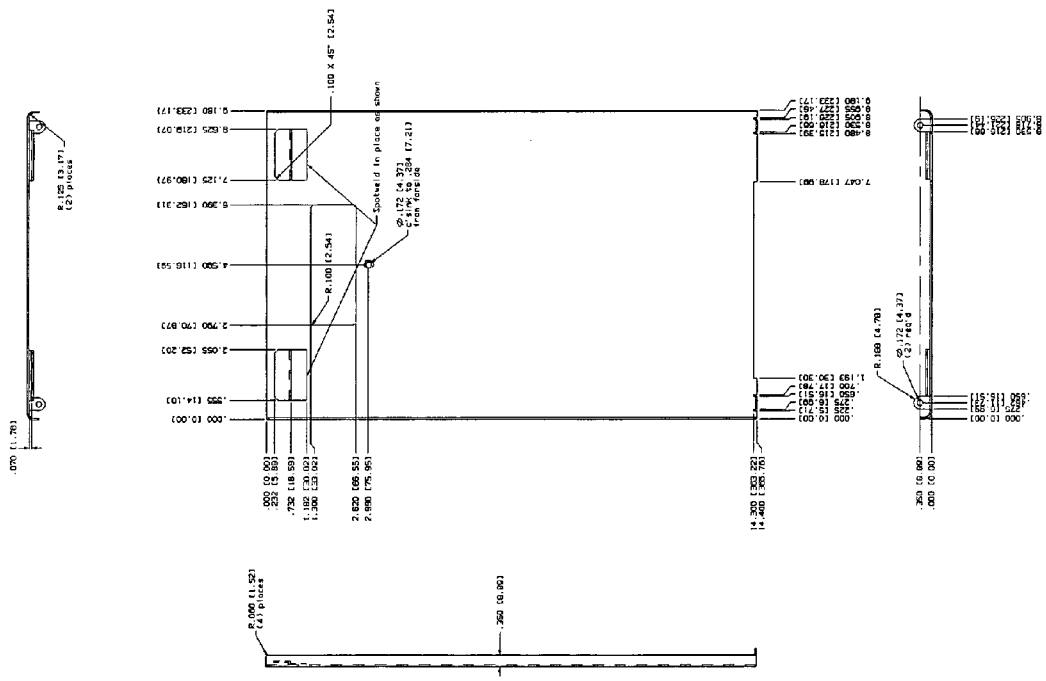
Figure 19:
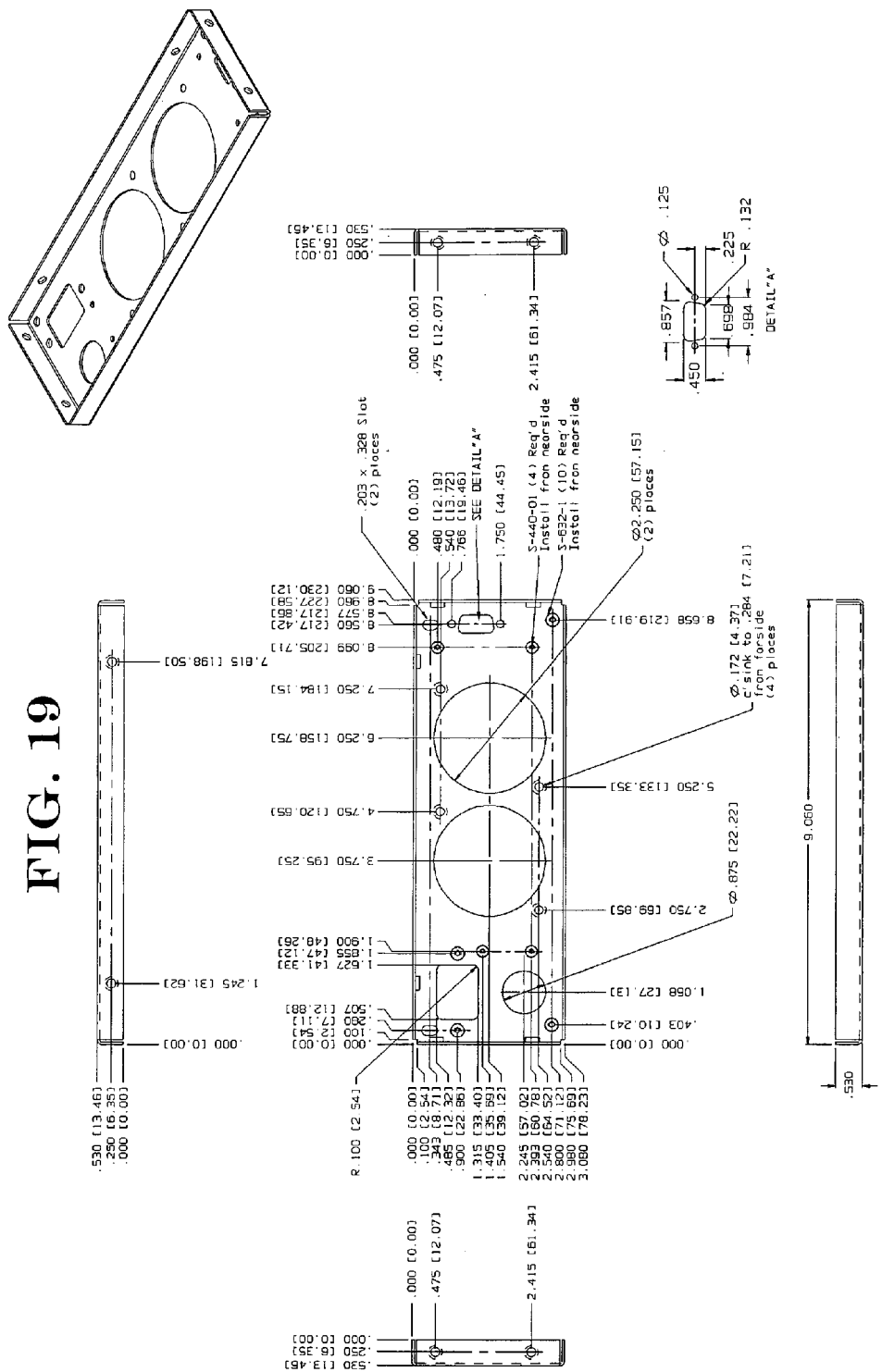
FIG. 19 depicts the bottom end panel of the inverter portion of the fourth exemplary UPQ unit.
Figure 20:
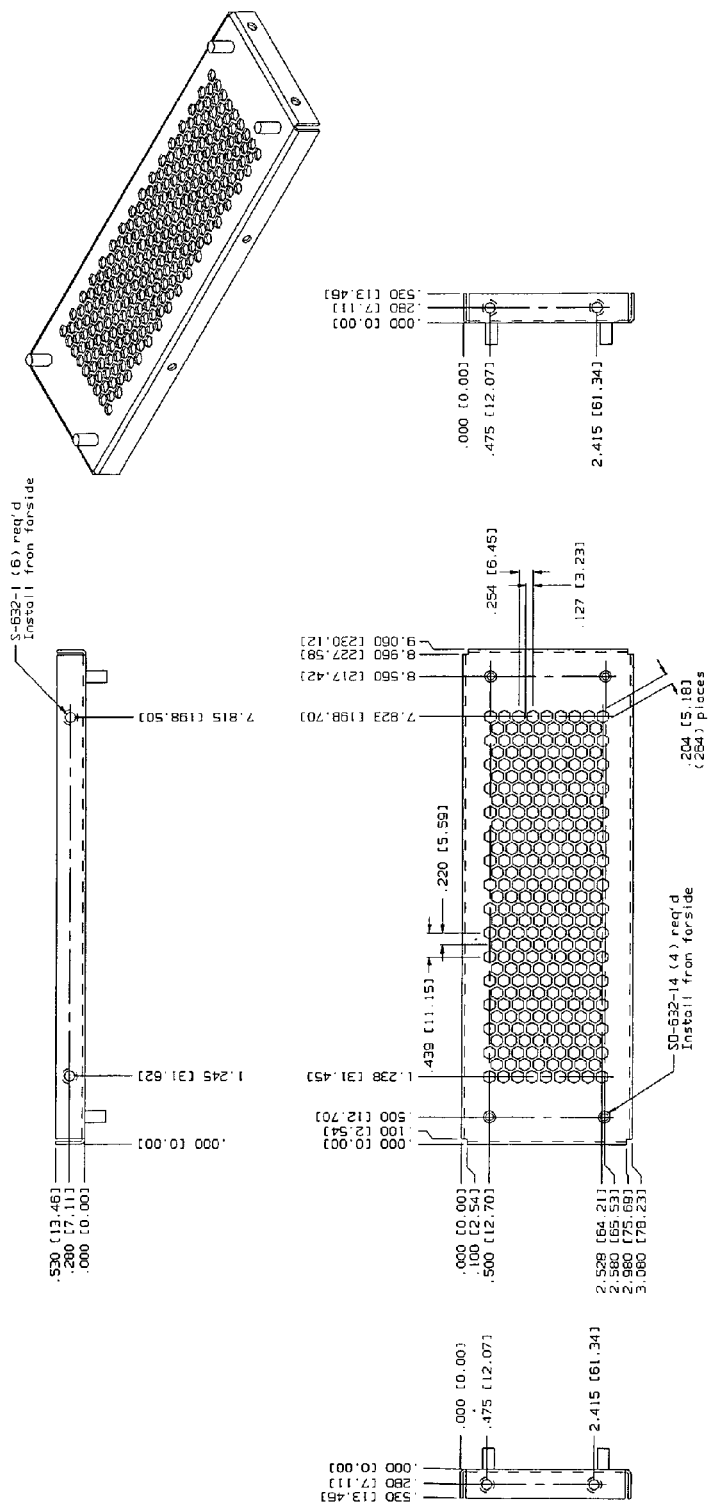
FIG. 20 depicts the top end panel of the inverter portion of the fourth exemplary UPQ unit.
Figure 21:
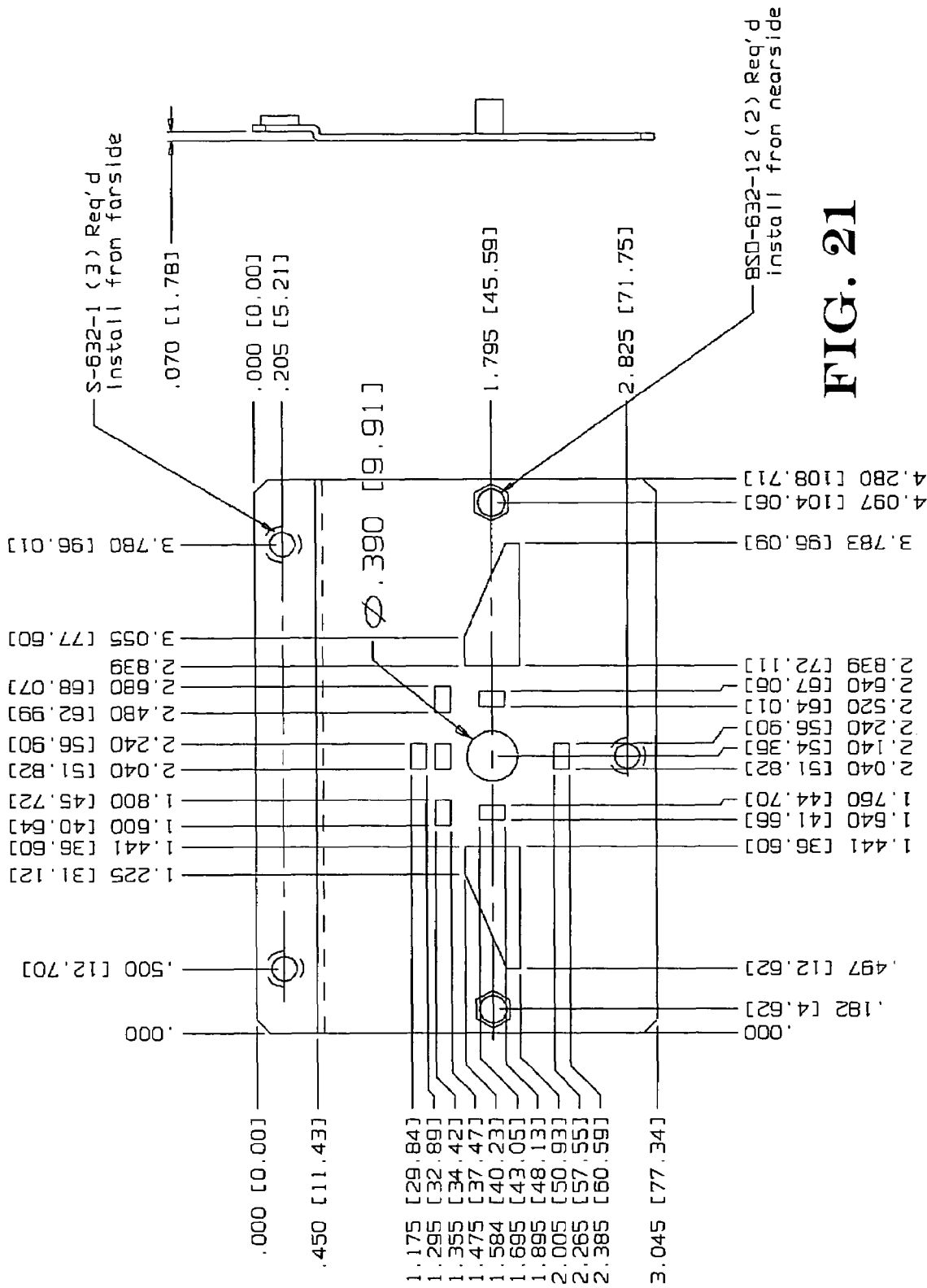
FIG. 21 depicts the display mount bracket of the inverter portion of the fourth exemplary UPQ unit.
Figure 22:
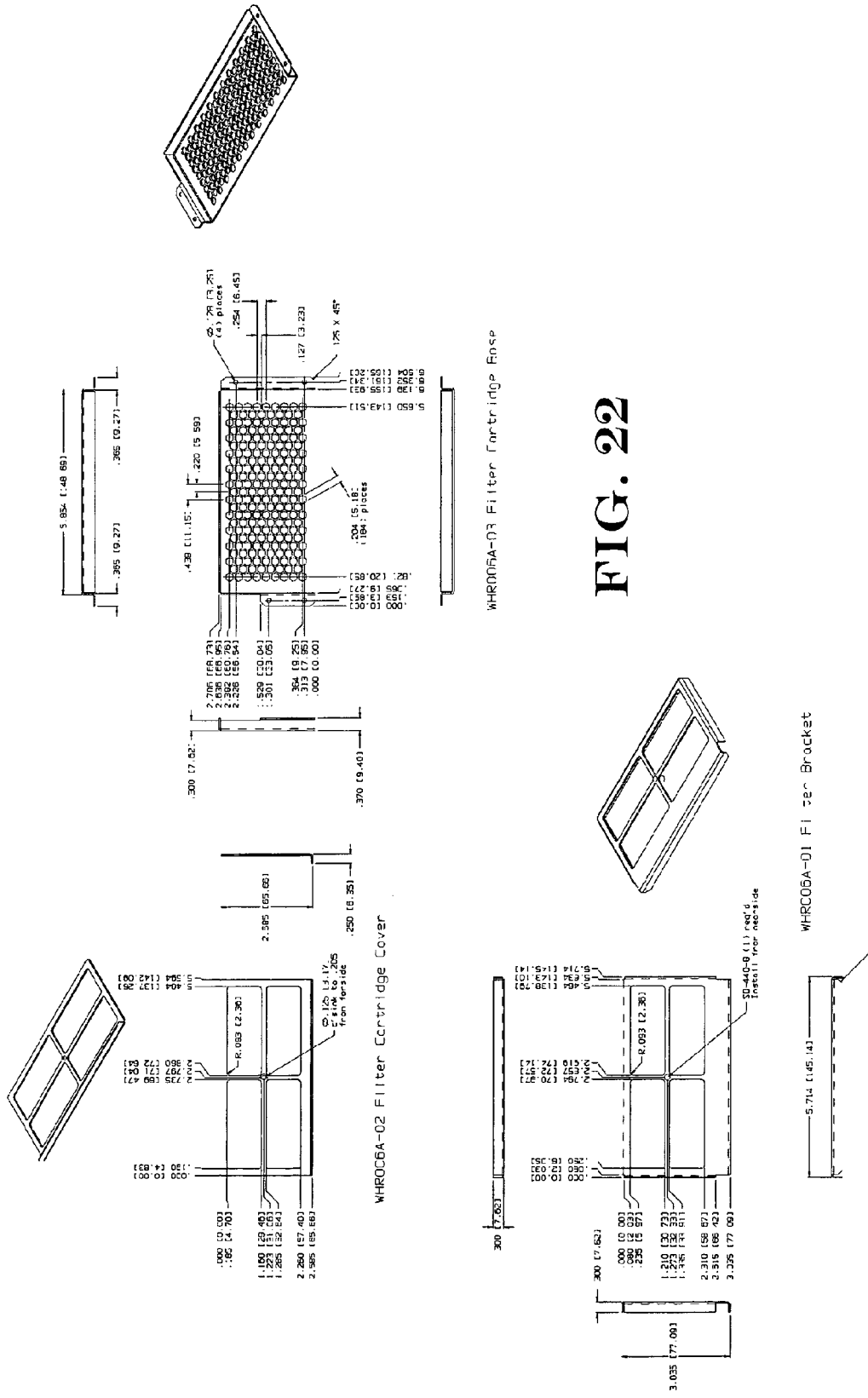
FIG. 22 depicts the relay mount bracket of the inverter portion of the fourth exemplary UPQ unit.
Figure 23:
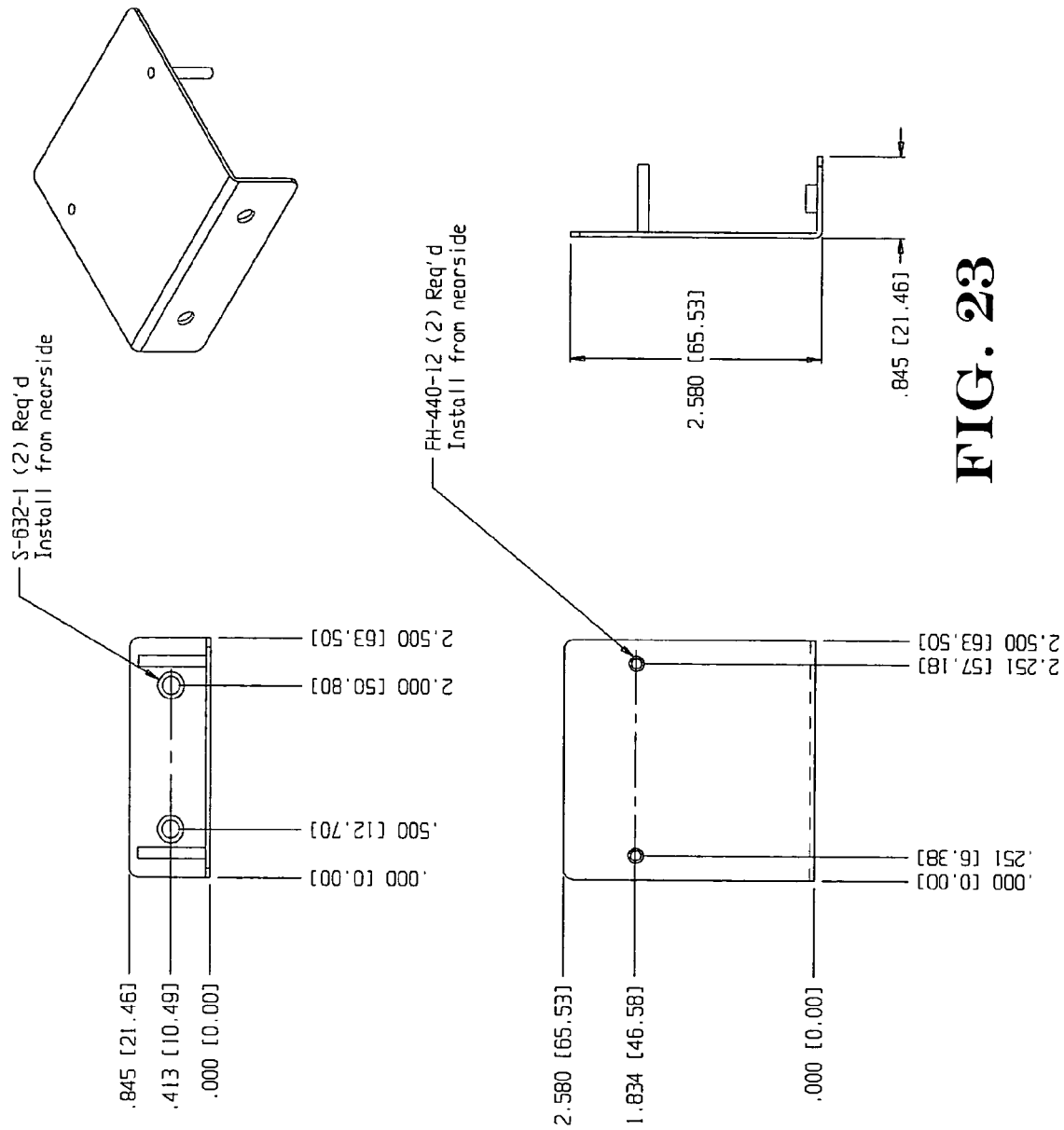
FIG. 23 depicts a mount bracket of the inverter portion of the fourth exemplary UPQ unit.
Figure 24:
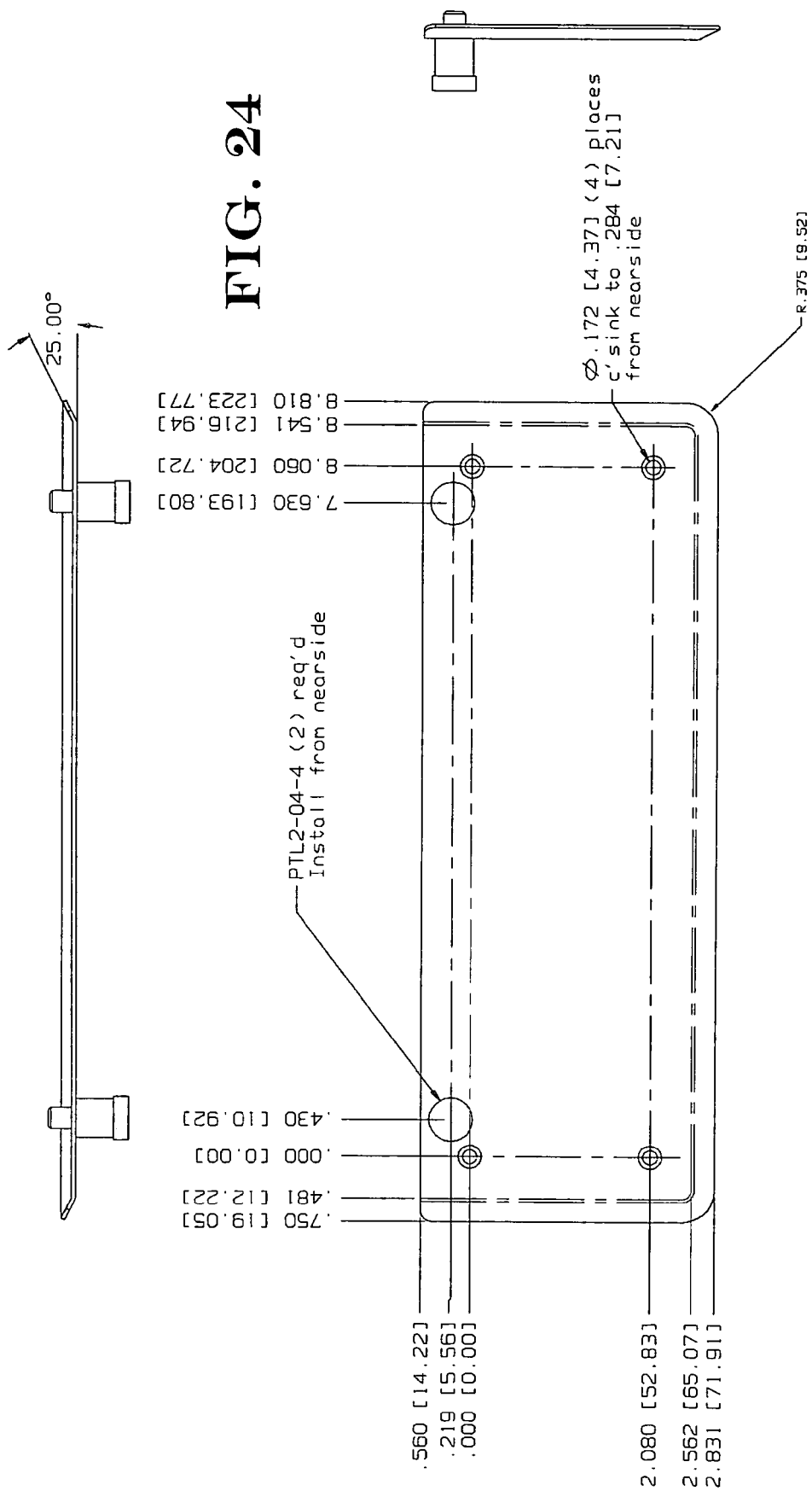
FIG. 24 depicts the splash guard of the inverter portion of the fourth exemplary UPQ unit.
Figure 25:
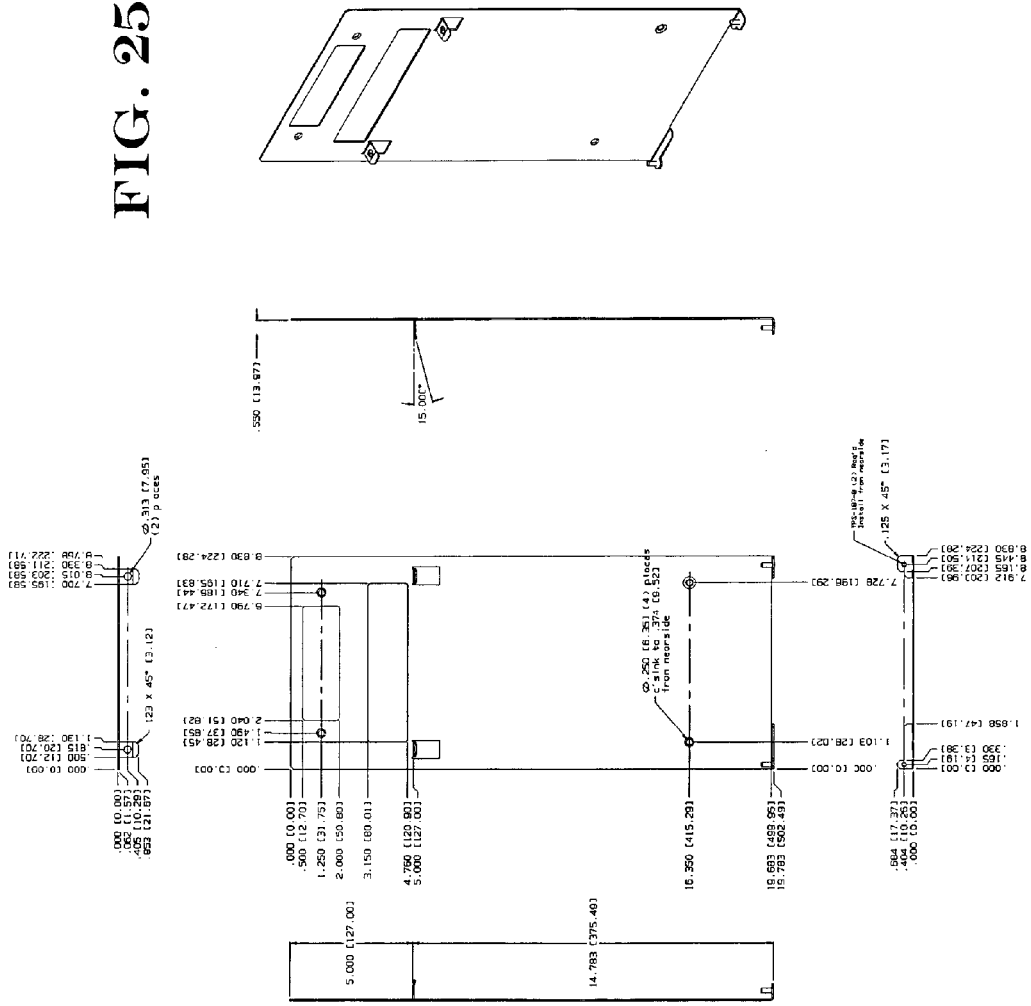
FIG. 25 depicts another mount bracket of the inverter portion of the fourth exemplary UPQ unit.
Figure 26:
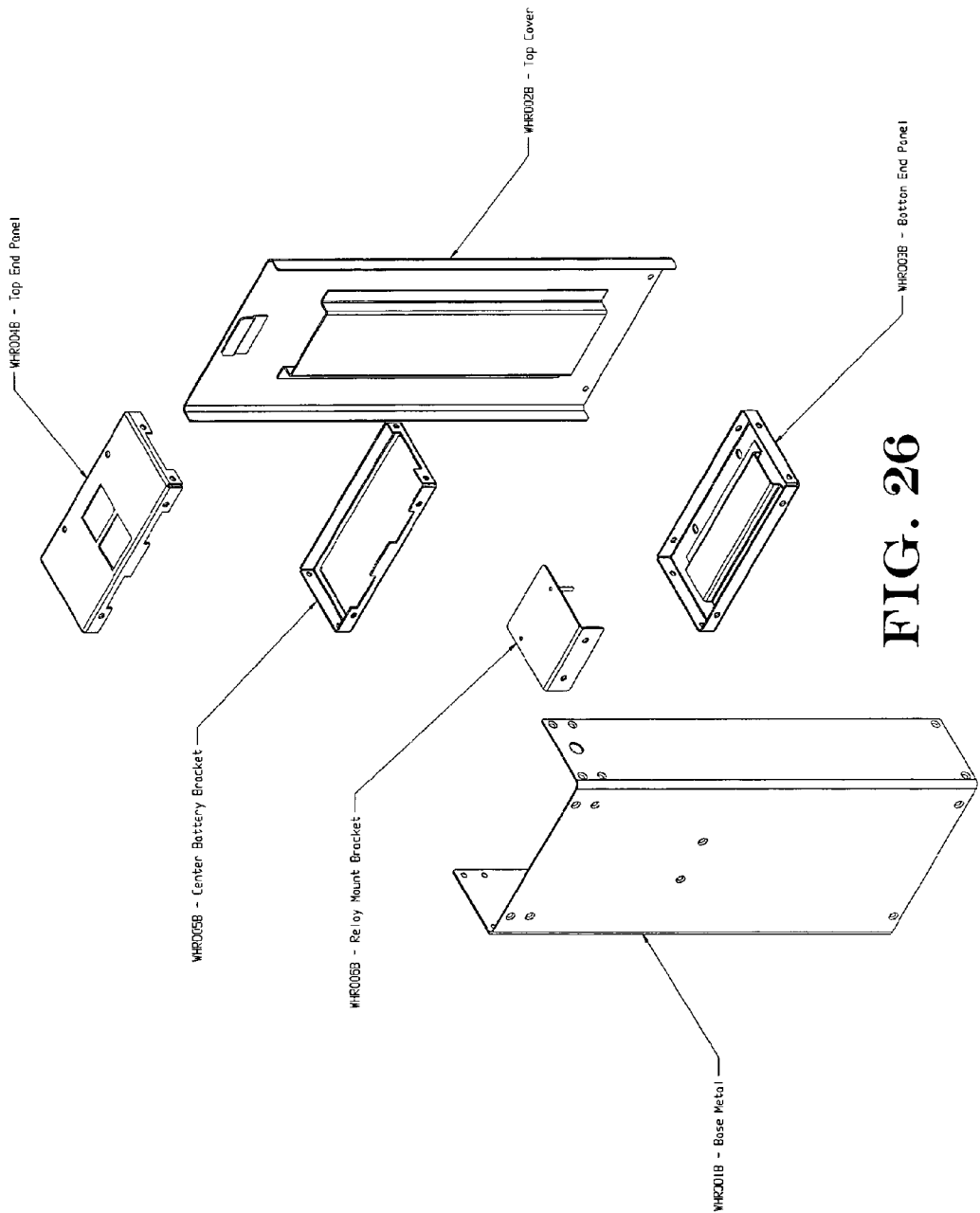
FIG. 26 depicts sheet metal components of the battery portion enclosure of the fourth exemplary UPQ unit.
Figure 27:
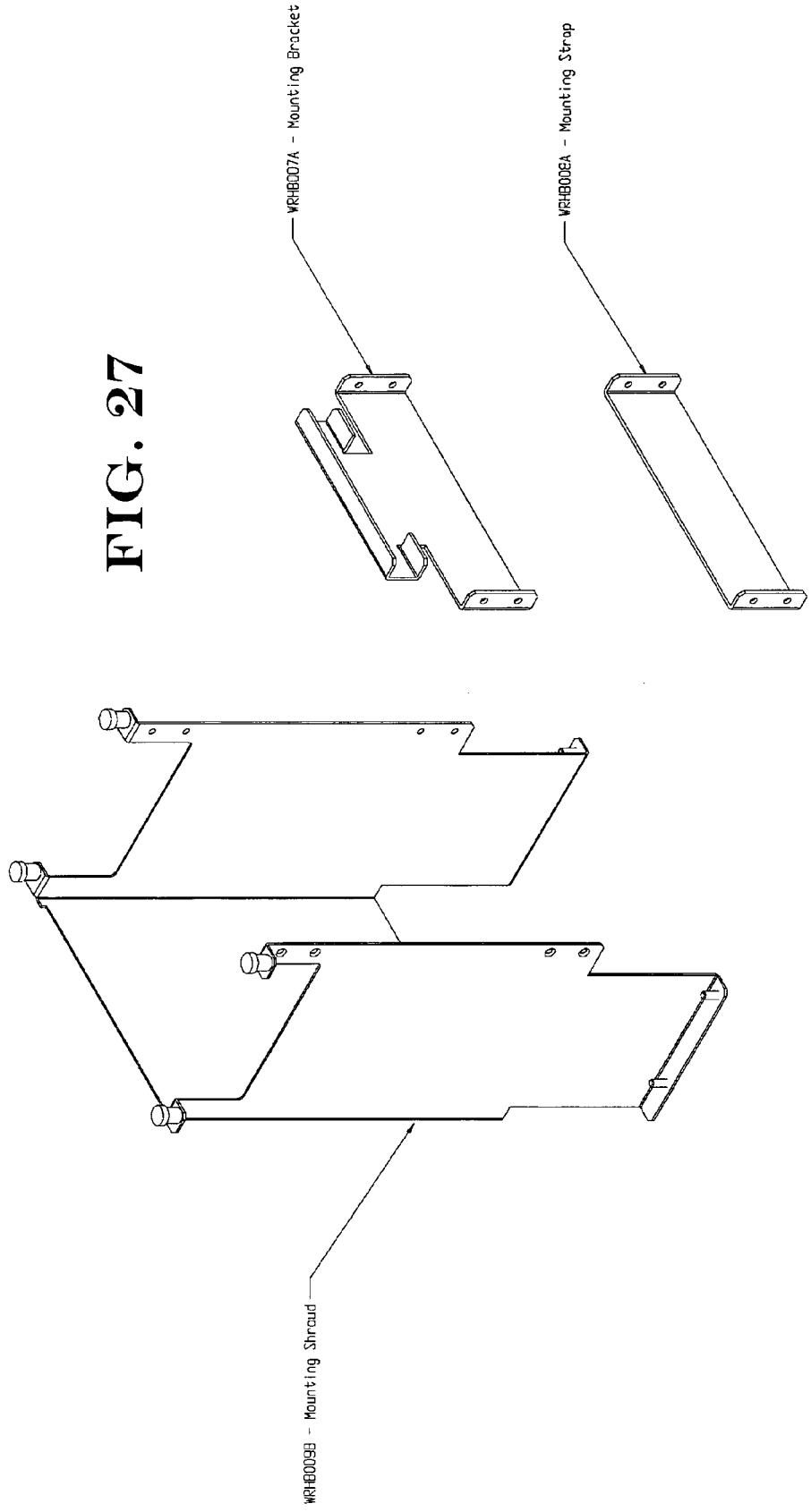
FIG. 27 depicts sheet metal components of the battery portion mount of the fourth exemplary UPQ unit.
Figure 28:
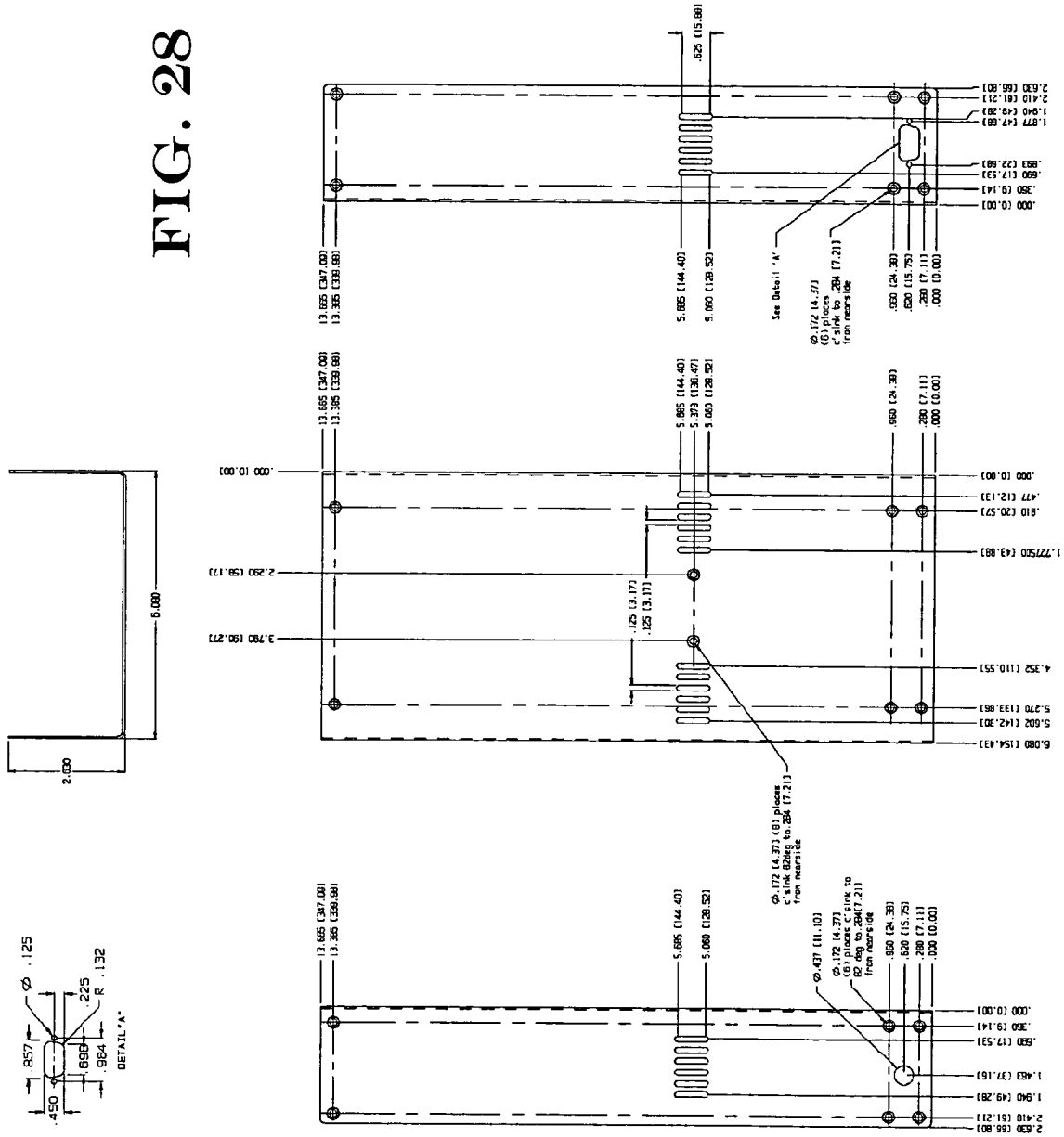
FIG. 28 depicts the base of the battery portion of the fourth exemplary UPQ unit.
Figure 29:
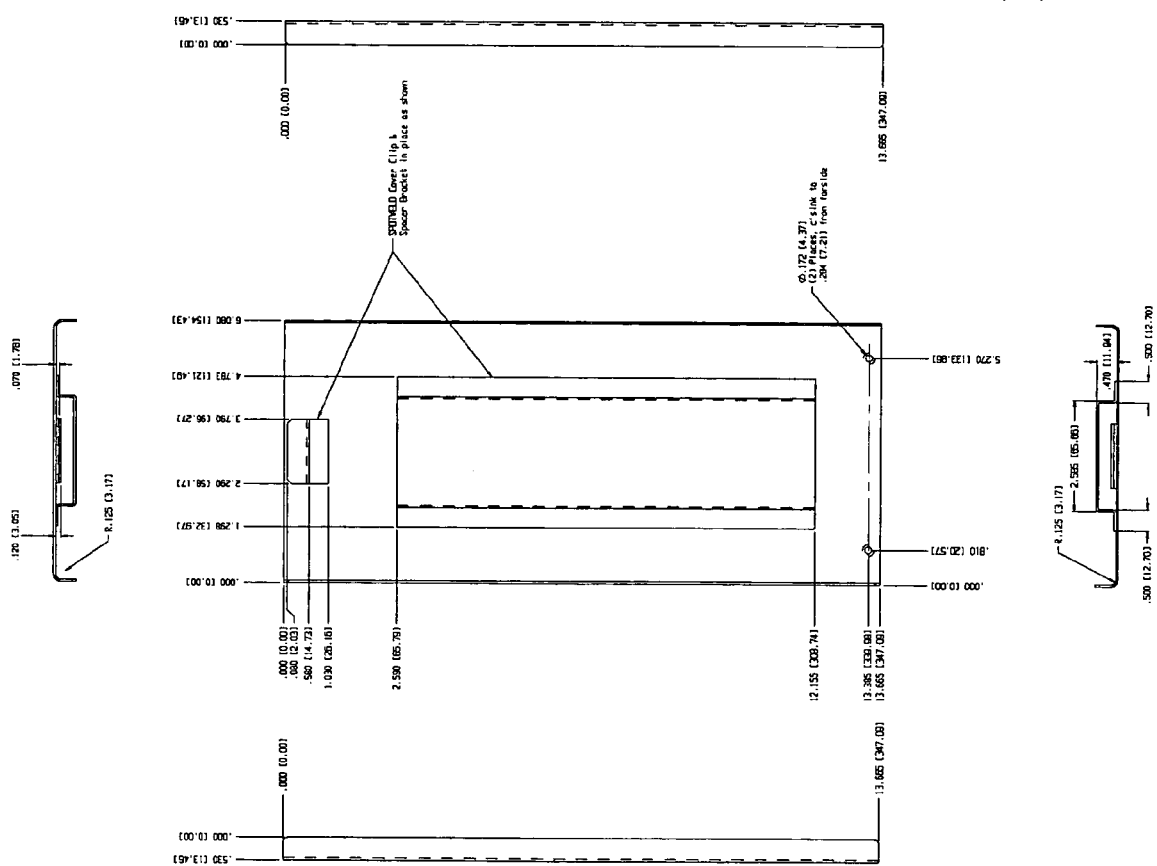
FIG. 29 depicts the top cover of the battery portion of the fourth exemplary UPQ unit.
Figure 30:
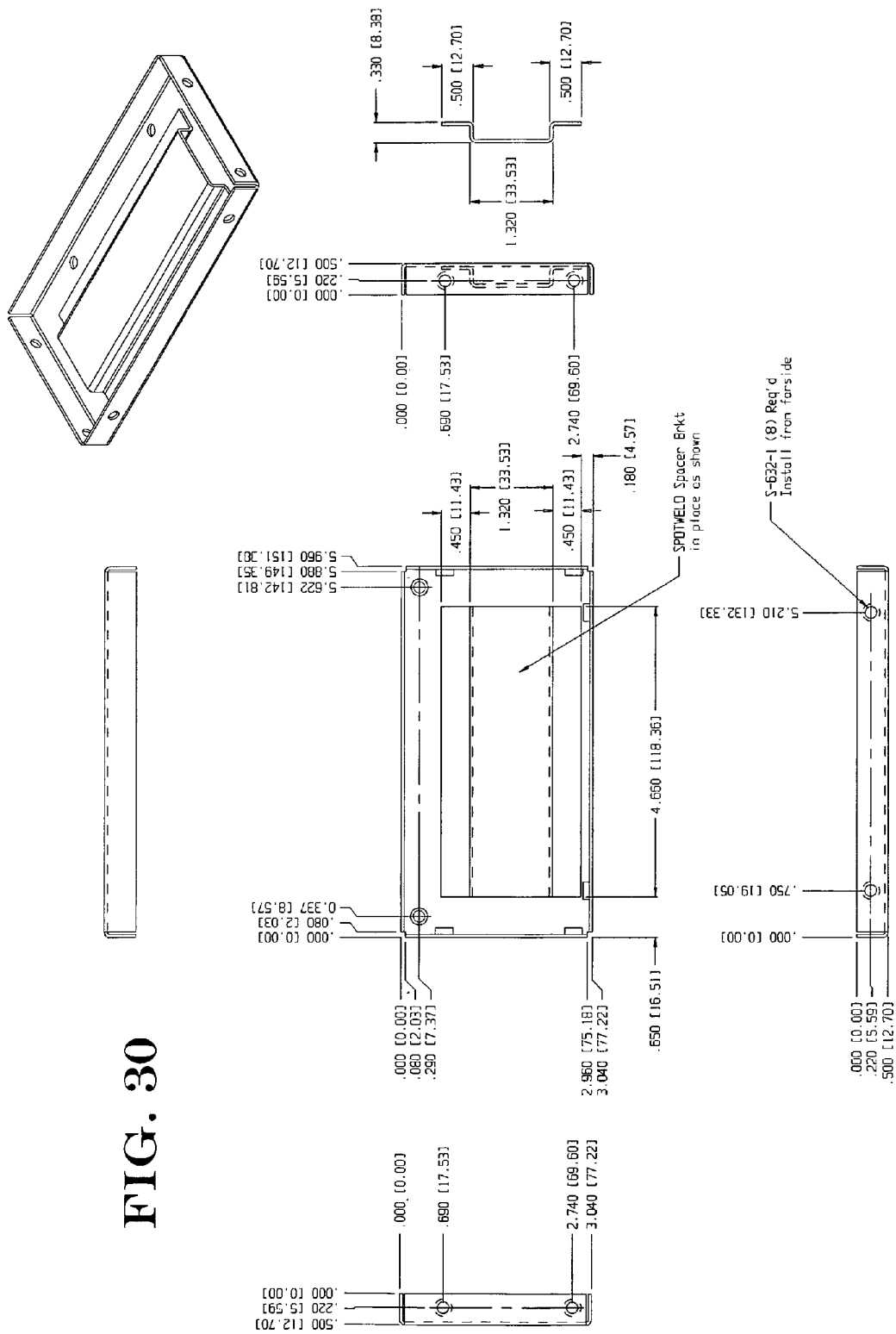
FIG. 30 depicts the top end panel of the battery portion of the fourth exemplary UPQ unit.
Figure 31:
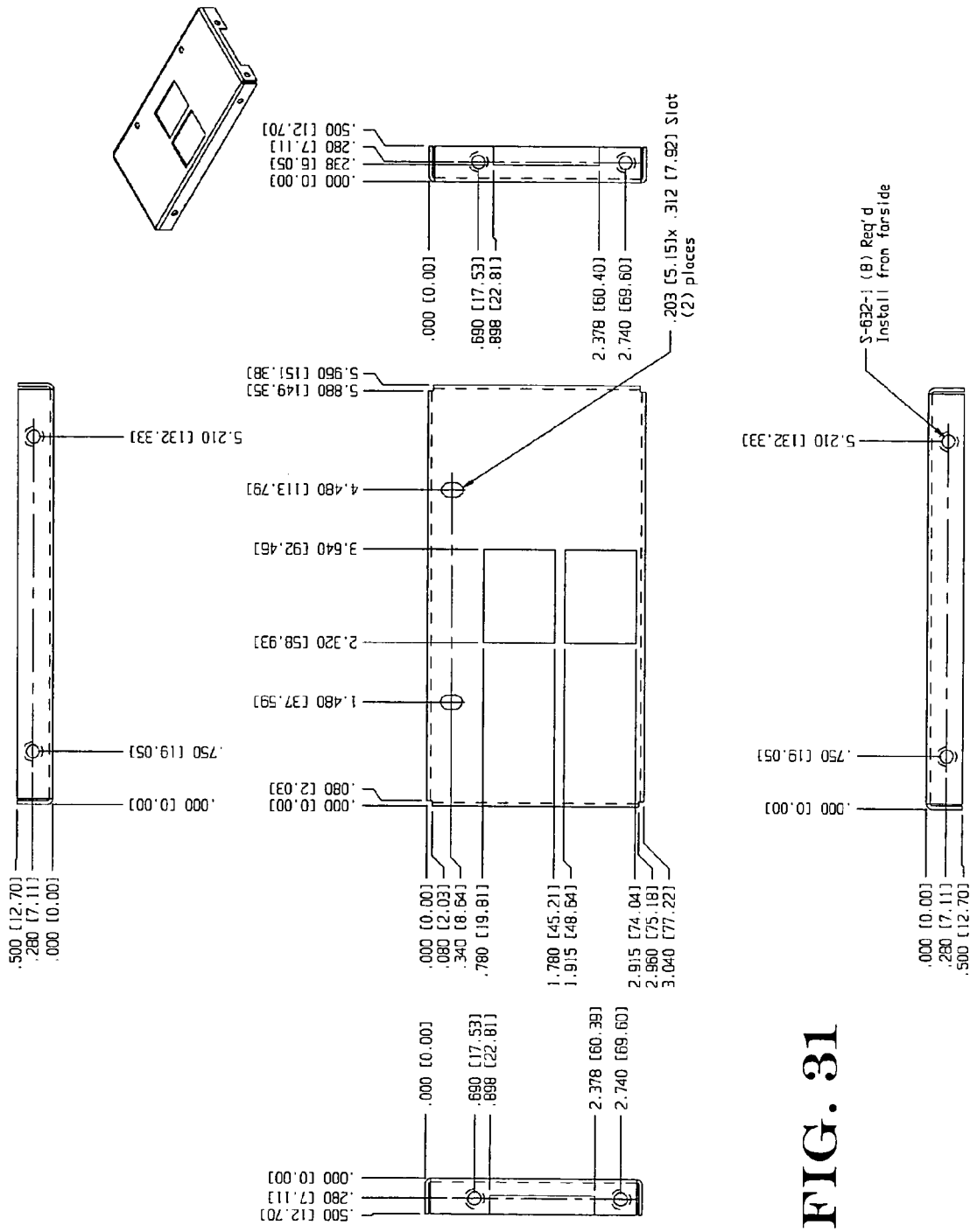
FIG. 31 depicts the bottom end panel of the battery portion of the fourth exemplary UPQ unit.
Figure 32:
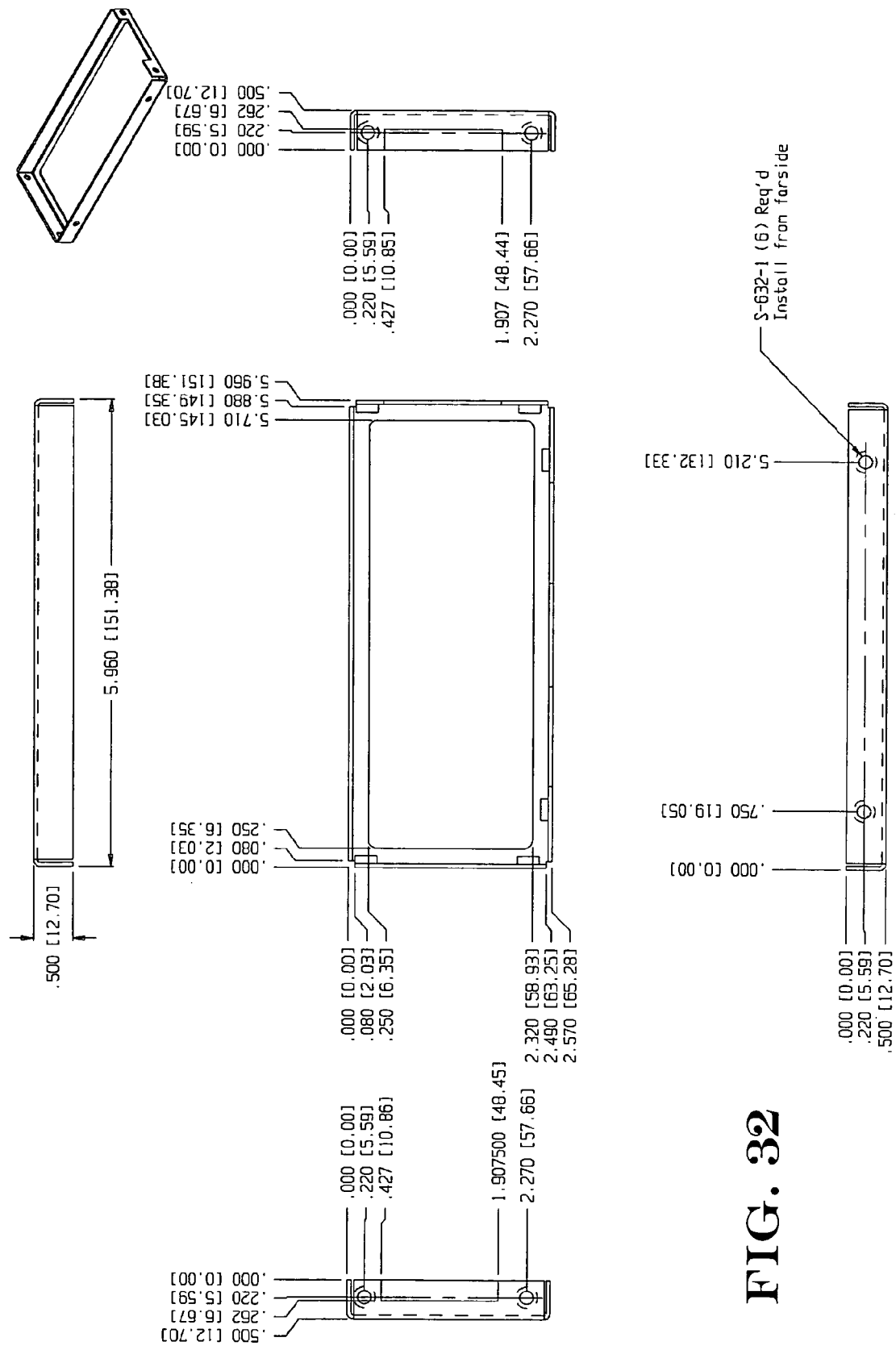
FIG. 32 depicts the center battery bracket of the battery portion of the fourth exemplary UPQ unit.
Figure 33:
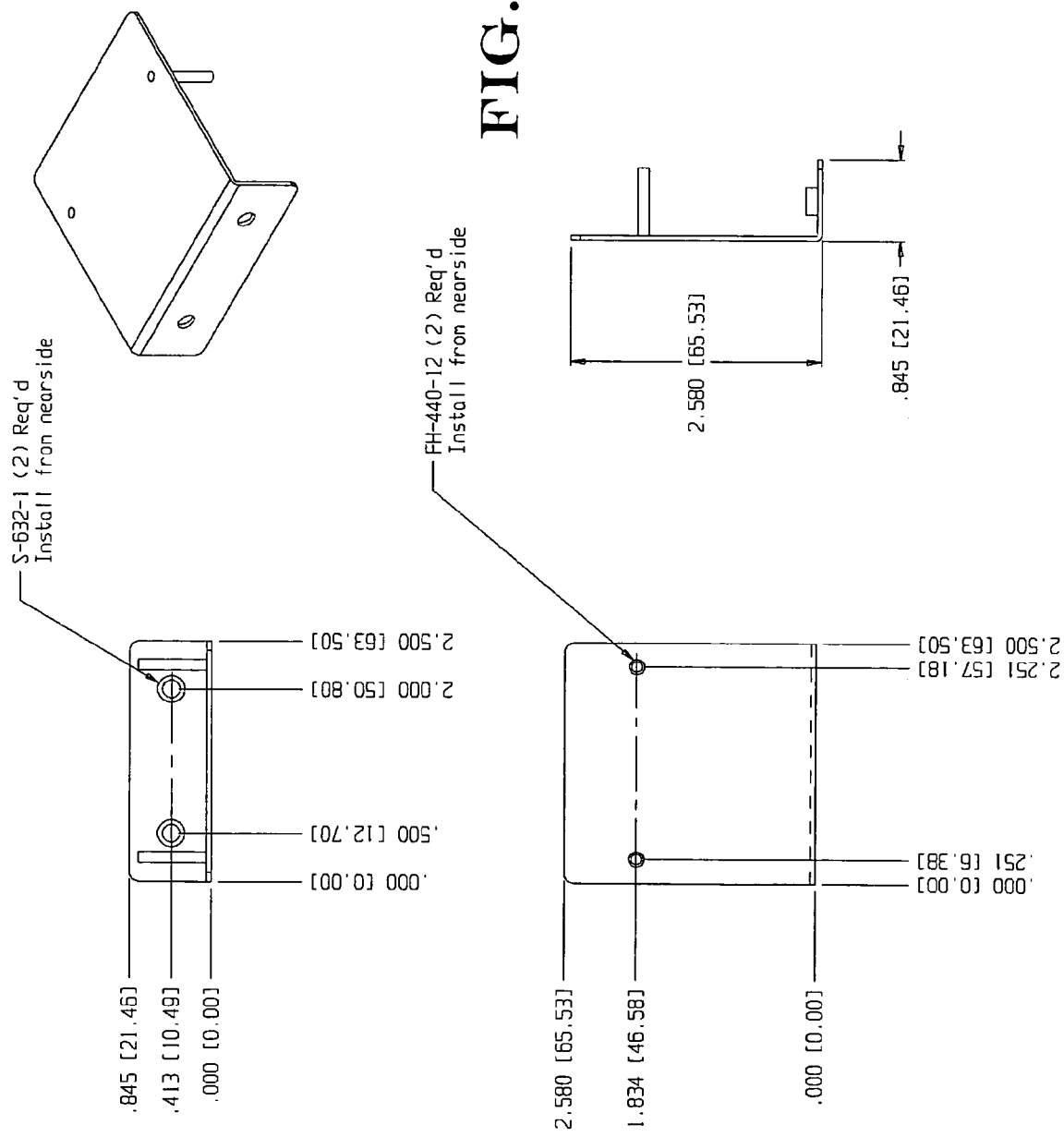
FIG. 33 depicts the relay mount bracket of the battery portion of the fourth exemplary UPQ unit.
Figure 34:
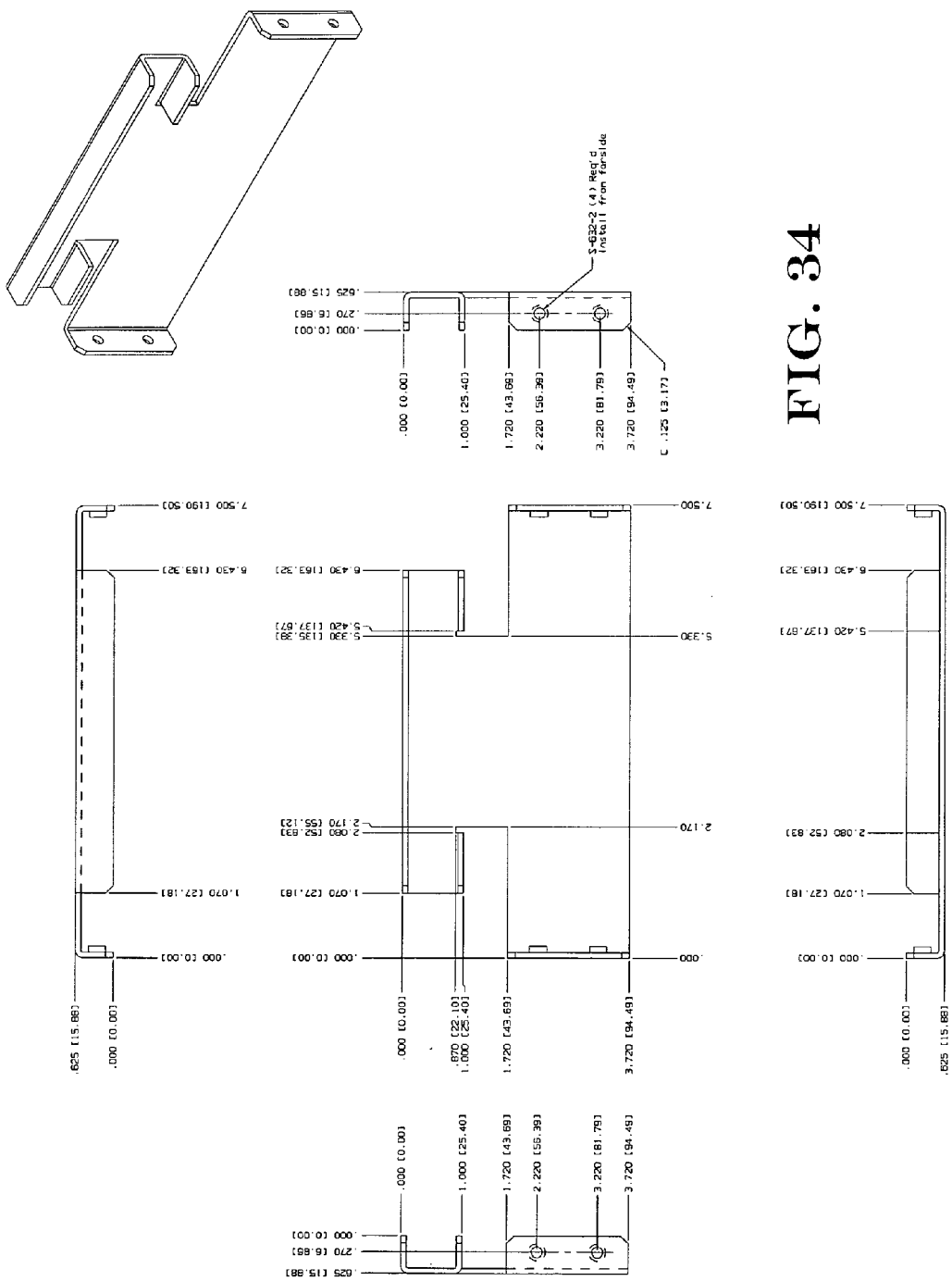
FIG. 34 depicts a mounting bracket of the battery portion of the fourth exemplary UPQ unit.
Figure 35:
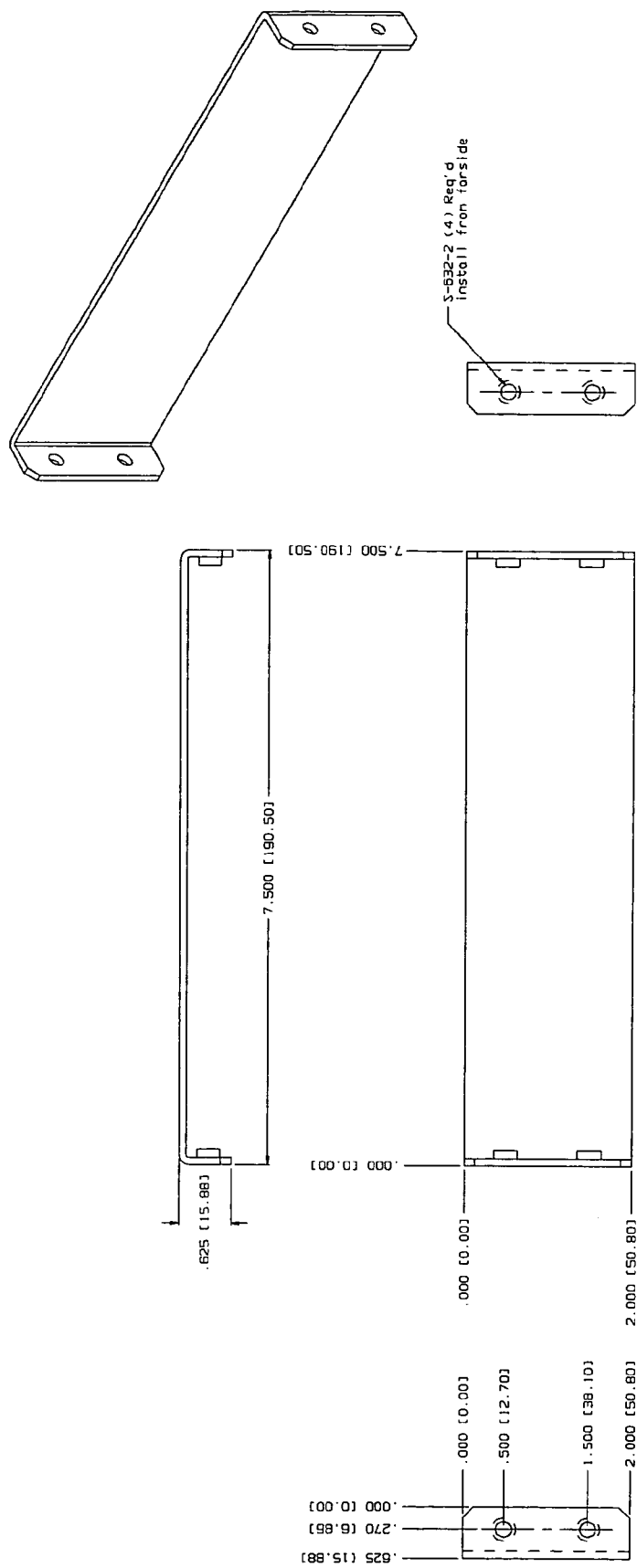
FIG. 35 depicts a mounting strap of the battery portion of the fourth exemplary UPQ unit.
Figure 36:
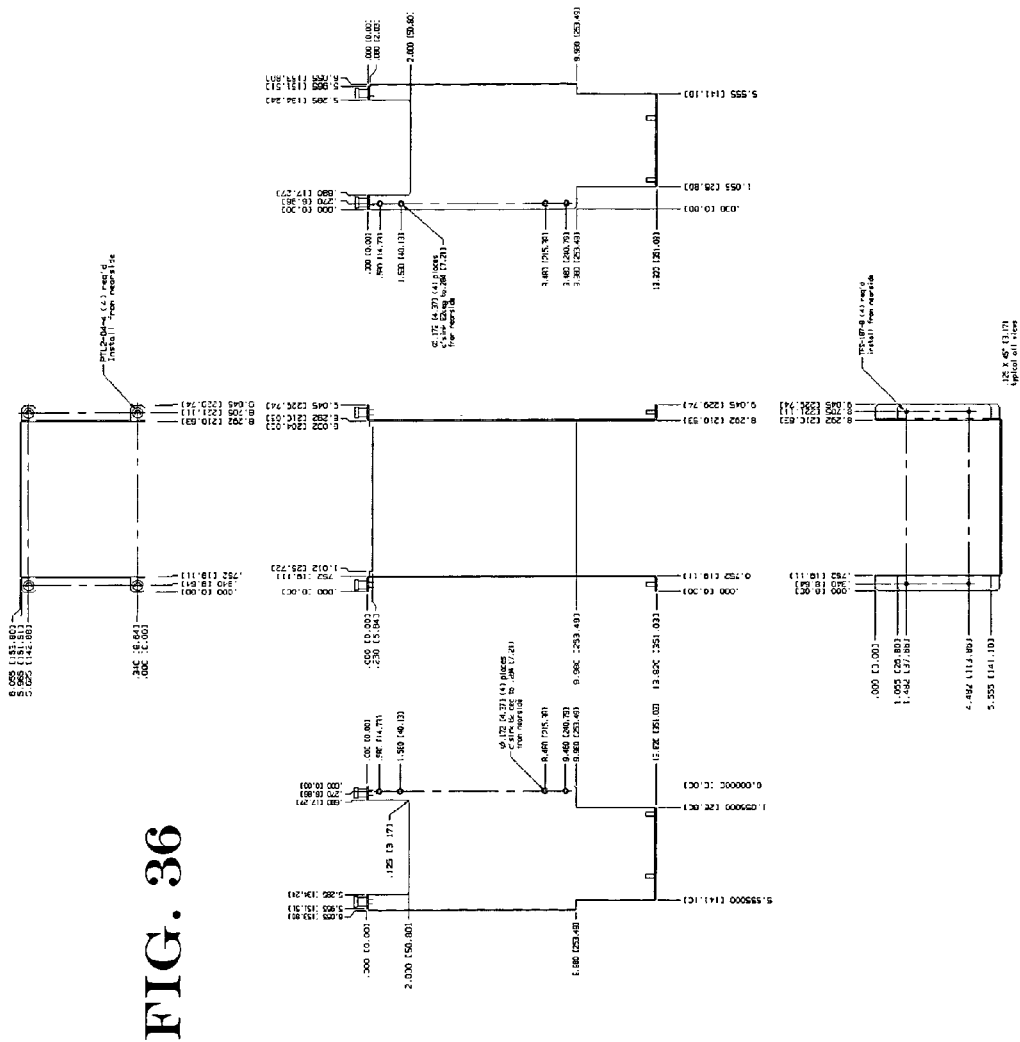
FIG. 36 depicts a battery module mount bracket of the battery portion of the fourth exemplary UPQ unit.

FIG. 15 depicts the rear of a third exemplary UPQ unit, which provides connections for an AC input (from mains power), output receptacles, an optional external battery connector, an optional RS-232 interface, and an optional LAN/Internet Ethernet connection for SNMP or HTTP based communication.

Figure 49:
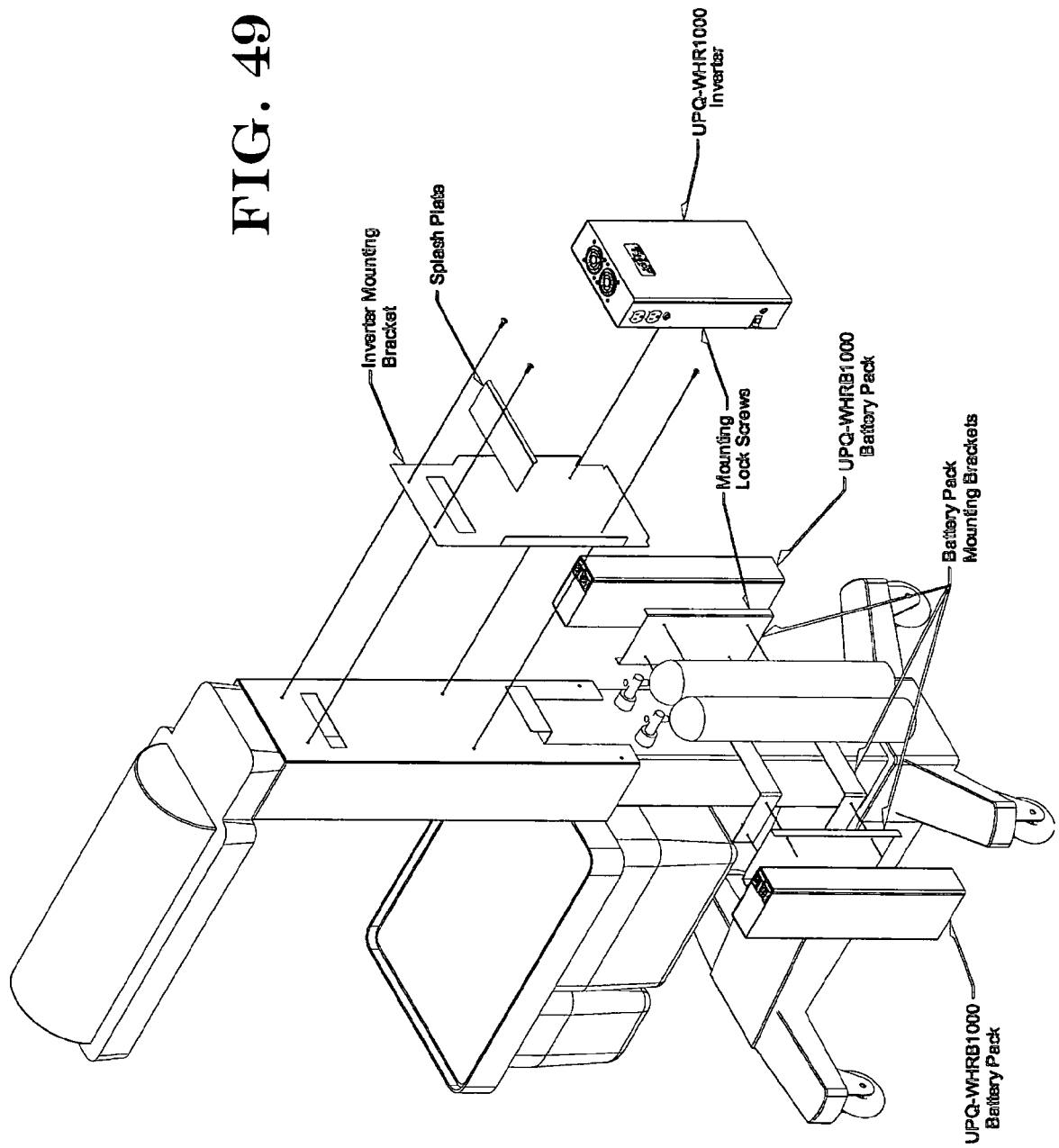
FIG. 49 depicts the mounting of the fourth exemplary UPQ unit to an exemplary infant warmer.
Figure 50:
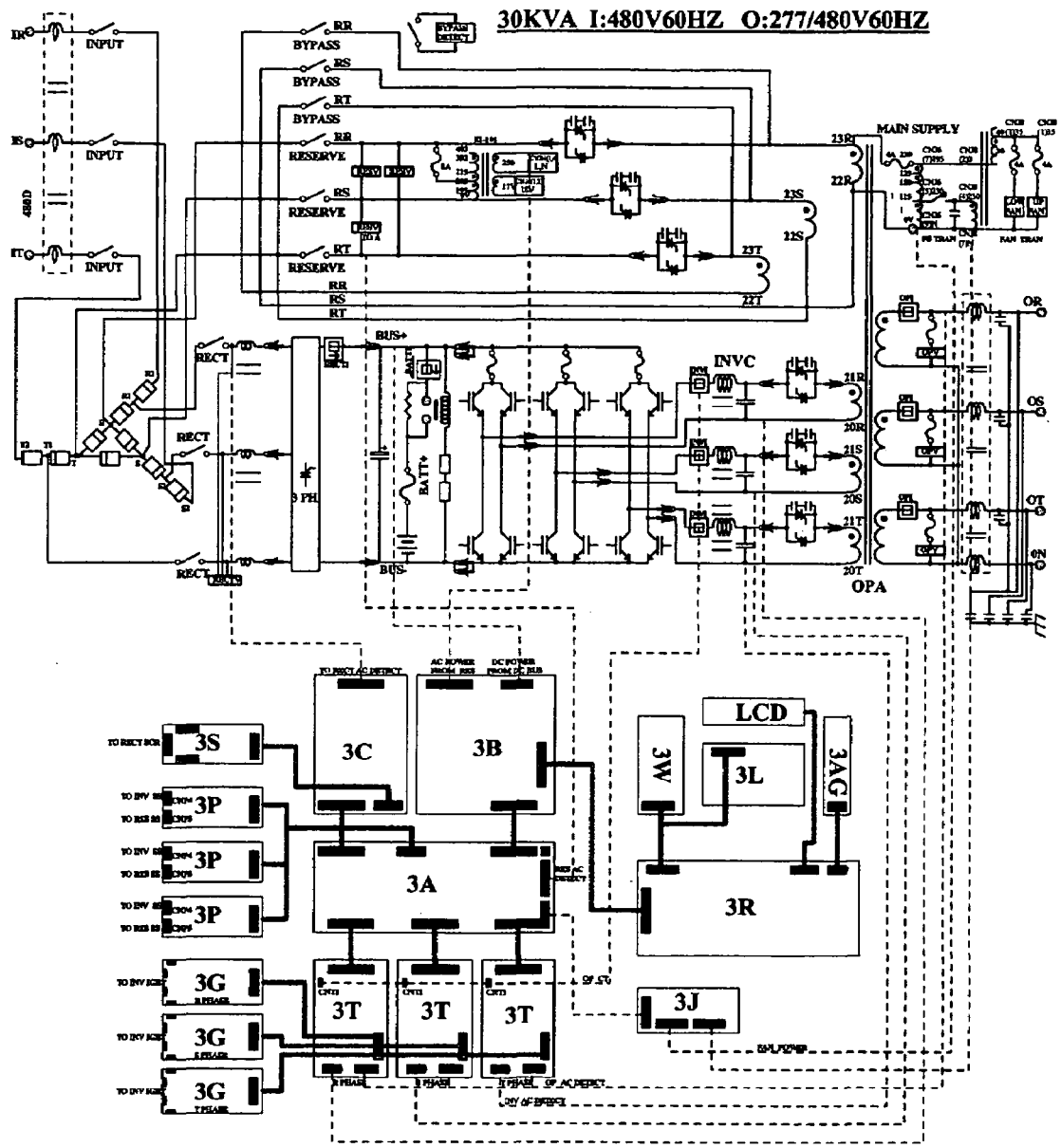
FIG. 50 depicts an exemplary circuit configuration for a UPQ unit.

A fourth exemplary UPQ unit type is divided into an inverter portion and a battery portion, the inverter portion being shown generally in FIGS. 16–25, and the battery portion in FIGS. 26–36. That UPQ unit is intended to be retrofit to an existing incubator unit, as shown in FIG. 49. It is installable using only simple tools, ideally with only a screwdriver.

While UPQ units have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A power conditioning system for providing clean and uninterrupted power to loads, comprising:
   a cabinet;
   an input circuit including a passive filter for receiving three phase AC power;
   an AC to DC converter receiving AC power from said input circuit;
   a regulating DC to DC converter receiving DC power from said AC to DC converter;
   a high frequency DC to AC inverter;
   an output circuit including a passive filter receiving power produced by said high frequency DC to AC inverter;
   two banks of batteries, said system configured to receive DC power from either of said banks to produce AC power by said high frequency DC to AC inverter such that the connection of both battery banks is not necessary to operate said high frequency DC to AC inverter, said system further configured to allow replacement of batteries in one of said banks while supplying power to said high frequency inverter from another of said battery banks, further wherein said banks are organized in a front and rear vertical rack, each rack providing access to each individual battery without the removal of other batteries, wherein the front rack may be swung about a pivot point near the bottom of the rack to provide access to the rear rack;
   a battery charging circuit receiving internal DC power, said battery charging circuit connected to provide charging for said batteries; and
   wherein said AC to DC converter is configured to operate using either 400 or 480 volt AC three phase input power.

2. A system according to claim 1, wherein said inverter utilizes pulse width modulation at about 50 kHz to produce AC power output.

3. A system according to claim 1, wherein said AC to DC converter is configured to operate using 50 or 60 Hz AC input power.

4. A system according to claim 1, wherein the capacity of the unit is about 30 kVA and the unit includes internal batteries for supplying power for at least 10 minutes at full capacity load.

5. A system according to claim 1, wherein said AC to DC converter includes a 12 pulse rectifier.

6. A system according to claim 1, wherein the system further comprises a main breaker or switch, and wherein the system prevents current from flowing from said batteries onto DC busses when said main breaker or switch is thrown.

7. A system according to claim 1, wherein the system may be started using internal or external batteries without an AC power source connected.

8. A system according to claim 1, wherein the system includes a CPU-controlled battery charging circuit that changes at either a normal rate or a boost rate if batteries are discharged to a minimum voltage level or below.

9. A system according to claim 1, wherein the system further comprises a master CPU that monitors the operation of the system modules.

10. A power conditioning system for providing clean and uninterrupted power to loads, comprising:
    a cabinet,
    an input circuit including a passive filter for receiving three phase AC power,
    an AC to DC converter receiving AC power from said input circuit,
    a regulating DC to DC converter receiving DC power from said AC to DC converter,
    a high frequency DC to AC inverter,
    an output circuit including a passive filter receiving power produced by said high frequency DC to AC inverter,
    two banks of batteries, said system configured to receive DC power from either of said banks to produce AC power by said high frequency DC to AC inverter such that the connection of both battery banks is not necessary to operate said high frequency DC to AC inverter, said system further configured to allow replacement of batteries in one of said banks while supplying power to said high frequency inverter from another of said battery banks, further wherein said banks are organized in a front and rear vertical rack, each rack providing access to each individual battery without the removal of other batteries, wherein the front rack may be swung about a pivot point near the bottom of the rack to provide access to the rear rack;
    a battery charging circuit receiving internal DC power, said battery charging circuit connected to provide charging for said batteries, a main breaker or switch, and wherein the system prevents current from flowing from said batteries onto DC busses when said main breaker or switch is thrown; and wherein said AC to DC converter is configured to operate using either 400 or 480 volt AC three phase input power at 50 or 60 Hz.

11. A system according to claim 10, wherein said inverter utilizes pulse width modulation at about 50 kHz to produce AC power output.

12. A system according to claim 10, wherein the capacity of the unit is about 30 kVA and the unit includes internal batteries for supplying power for at least 10 minutes at full capacity load.

13. A system according to claim 10, wherein said AC to DC converter includes a 12 pulse rectifier.

14. A system according to claim 10, wherein the system may be started using internal or external batteries without an AC power source connected.

15. A system according to claim 10, wherein the system includes a CPU-controlled battery charging circuit that charges at either a normal rate or a boost rate if batteries are discharged to a minimum voltage level or below.

16. A system according to claim 10, wherein the system further comprises a master CPU that monitors the operation of the system modules.

17. A power conditioning system for providing clean and uninterrupted power to loads, comprising:
  a cabinet;
  an input circuit including a passive filter for receiving three phase AC power;
  an AC to DC converter receiving AC power from said input circuit, said AC to DC converter further including a 12 pulse rectifier, further wherein said AC to DC converter is configured to operate using either 400 or 480 volt AC three phase input power at 50 or 60 Hz.;
  a regulating DC to DC converter receiving DC power from said AC to DC converter;
  a high frequency DC to AC inverter utilizing pulse width modulation at about 50 kHz to produce AC power output;
  an output circuit including a passive filter receiving power produced by said high frequency DC to AC inverter;
  two banks of batteries, said system configured to receive DC power from either of said banks to produce AC power by said high frequency DC to AC inverter such that the connection of both battery banks is not necessary to operate said high frequency DC to AC inverter, said system further configured to allow replacement of batteries in one of said banks while supplying power to said high frequency inverter from the other battery bank, further wherein said banks are organized in a front and rear vertical rack, each jack providing access to each individual battery without the removal of other batteries, wherein the front rack may be swung about a pivot point near the bottom of the rack to provide access to the rear rack;
  a battery charging circuit receiving internal DC power, said battery charging circuit connected to provide charging for said batteries;
  a CPU-controlled battery charging circuit that charges at either a normal rate or a boost rate if batteries are discharged to a minimum voltage level or below;
  a main breaker or switch, and wherein the system prevents current from flowing from said batteries onto DC busses when said main bieaker or switch is thrown;
  wherein the capacity of the unit is about 30 kVA and the unit includes internal batteries for supplying power for at least 10 minutes at full capacity load.

* * * * *